(12) United States Patent
Kumar et al.

(10) Patent No.: US 12,373,876 B2
(45) Date of Patent: Jul. 29, 2025

(54) TRANSACTION MODIFICATION BASED ON MODELED PROFILES

(71) Applicant: Block, Inc., Oakland, CA (US)

(72) Inventors: Abhay Kumar, San Francisco, CA (US); Dan Hipschman, San Francisco, CA (US); Rong Yan, Palo Alto, CA (US); John Berian James, San Francisco, CA (US); Gian Perrone, San Francisco, CA (US); Mai Leduc, San Francisco, CA (US)

(73) Assignee: Block, Inc., Oakland, CA (US)

( * ) Notice: Subject to any disclaimer, the term of this patent is extended or adjusted under 35 U.S.C. 154(b) by 0 days.

(21) Appl. No.: 18/451,008

(22) Filed: Aug. 16, 2023

(65) Prior Publication Data

US 2023/0394553 A1 Dec. 7, 2023

Related U.S. Application Data

(63) Continuation of application No. 17/065,072, filed on Oct. 7, 2020, now Pat. No. 11,776,038, which is a
(Continued)

(51) Int. Cl.
*G06Q 30/0601* (2023.01)
*G06Q 20/20* (2012.01)
(Continued)

(52) U.S. Cl.
CPC ......... *G06Q 30/0631* (2013.01); *G06Q 20/20* (2013.01); *G06Q 30/0205* (2013.01);
(Continued)

(58) Field of Classification Search
CPC ............... G06Q 30/0631; G06Q 20/20; G06Q 30/0205; G06Q 30/0206; G06Q 30/0253;
(Continued)

(56) References Cited

U.S. PATENT DOCUMENTS 5,057,829 A 10/1991 Velazquez
5,168,445 A 12/1992 Kawashima et al.
(Continued)

FOREIGN PATENT DOCUMENTS

CA 2332083 A1 7/2001
GB 2506841 A 4/2014
WO 01/95136 A2 12/2001

OTHER PUBLICATIONS

Chen, F., and Samroengraja, R., "A Staggered Ordering Policy for One-Warehouse, Multiretailer Systems," Operations Research, vol. 48, Issue 2, pp. 281-293 (Apr. 1, 2000).
(Continued)

Primary Examiner — A. Hunter Wilder
(74) Attorney, Agent, or Firm — Lee & Hayes, P.C.

(57) ABSTRACT

Transaction modification based on modeled profiles is described. In an example, transaction data can be received from merchant computing devices associated with merchants associated with a payment processing system. A model can be trained to generate profiles using, as training data, one or more of merchant data, buyer data, or the transaction data. Upon receiving an indication of a particular transaction between a buyer and a merchant, it can be determined that a characteristic of the transaction corresponds to a profile of the generated profiles. Based on the determination that the characteristic corresponds to the profile and the transaction data, a recommendation can be generated for a modification of the transaction to add an item or replace an item.

20 Claims, 13 Drawing Sheets

Related U.S. Application Data continuation of application No. 16/369,455, filed on Mar. 29, 2019, now Pat. No. 10,810,650, which is a continuation of application No. 15/445,619, filed on Feb. 28, 2017, now Pat. No. 10,304,117, which is a continuation of application No. 14/289,469, filed on May 28, 2014, now Pat. No. 9,619,831.

(60) Provisional application No. 61/969,720, filed on Mar. 24, 2014.

(51) Int. Cl.
    *G06Q 30/0201*     (2023.01)
    *G06Q 30/0204*     (2023.01)
    *G06Q 30/0251*     (2023.01)

(52) U.S. Cl.
    CPC ..... *G06Q 30/0206* (2013.01); *G06Q 30/0253* (2013.01); *G06Q 30/0264* (2013.01); *G06Q 30/0255* (2013.01); *G06Q 30/0268* (2013.01)

(58) Field of Classification Search
    CPC ........... G06Q 30/0264; G06Q 30/0255; G06Q 30/0268
    See application file for complete search history.

(56) References Cited

U.S. PATENT DOCUMENTS

| | | |
|---|---|---|
| 5,353,218 A | 10/1994 | De et al. |
| 5,765,143 A | 6/1998 | Sheldon et al. |
| 5,933,813 A | 8/1999 | Teicher et al. |
| 6,151,582 A | 11/2000 | Huang et al. |
| 6,431,444 B1 | 8/2002 | Gatto |
| 6,595,342 B1 | 7/2003 | Maritzen et al. |
| 6,609,101 B1 | 8/2003 | Landvater |
| 6,687,679 B1 | 2/2004 | Van et al. |
| 6,694,300 B1 | 2/2004 | Walker et al. |
| 7,013,290 B2 | 3/2006 | Ananian |
| 7,222,786 B2 | 5/2007 | Renz et al. |
| 7,343,319 B1 | 3/2008 | Walker et al. |
| 7,552,066 B1 | 6/2009 | Landvater |
| 7,660,738 B1 | 2/2010 | Siegel et al. |
| 7,720,708 B1 | 5/2010 | Elkins et al. |
| 7,792,256 B1 | 9/2010 | Arledge et al. |
| 7,818,284 B1 | 10/2010 | Walker et al. |
| 7,882,209 B1 | 2/2011 | Eslambolchi et al. |
| 7,912,748 B1 | 3/2011 | Rosenberg et al. |
| 7,941,331 B2 | 5/2011 | Dogan et al. |
| 7,979,299 B1 | 7/2011 | Mehta et al. |
| 8,001,017 B1 | 8/2011 | Franco |
| 8,103,538 B2 | 1/2012 | Bamberg et al. |
| 8,175,908 B1* | 5/2012 | Anderson .......... G06Q 30/0201 |
| | | 705/7.29 |
| 8,204,799 B1 | 6/2012 | Murray et al. |
| 8,239,296 B2 | 8/2012 | Itoi et al. |
| 8,266,014 B1 | 9/2012 | Bhosle et al. |
| 8,296,187 B2 | 10/2012 | Light et al. |
| 8,355,954 B1 | 1/2013 | Goldberg et al. |
| 8,417,572 B1 | 4/2013 | Chenault |
| 8,438,066 B1 | 5/2013 | Yuen et al. |
| 8,533,053 B2 | 9/2013 | Brown et al. |
| 8,650,062 B2 | 2/2014 | Krech |
| 8,732,040 B1 | 5/2014 | Prabhune et al. |
| 9,015,277 B1 | 4/2015 | Slavin et al. |
| 9,168,315 B1 | 10/2015 | Scaringe et al. |
| 9,286,608 B1 | 3/2016 | Patel et al. |
| 9,323,441 B1 | 4/2016 | Minks-Brown et al. |
| 9,619,483 B1 | 4/2017 | Robinson et al. |
| 9,619,831 B1 | 4/2017 | Kumar et al. |
| 9,659,310 B1 | 5/2017 | Allen et al. |
| 9,767,471 B1 | 9/2017 | Perrone et al. |
| 9,786,005 B1 | 10/2017 | Poursartip et al. |
| 9,792,597 B1 | 10/2017 | Jen et al. |
| 9,990,621 B1 | 6/2018 | Ng et al. |
| 10,198,749 B1 | 2/2019 | Haskin |
| 10,339,548 B1 | 2/2019 | Kumar et al. |
| 10,304,117 B2 | 5/2019 | Kumar et al. |
| 10,318,569 B1 | 6/2019 | Funk et al. |
| 10,373,118 B1 | 8/2019 | Lefkow et al. |
| 10,467,583 B1 | 11/2019 | Jen et al. |
| 10,810,650 B2 | 10/2020 | Kumar et al. |
| 10,832,290 B1 | 11/2020 | Chennavasin et al. |
| 11,042,901 B1 | 6/2021 | Bebawy et al. |
| 11,210,725 B2 | 12/2021 | Kumar et al. |
| 11,295,337 B1 | 4/2022 | Bebawy et al. |
| 11,966,961 B2 | 4/2024 | Kumar et al. |
| 2001/0034722 A1 | 10/2001 | Tidball et al. |
| 2001/0037250 A1 | 11/2001 | Lefkowitz |
| 2001/0042008 A1 | 11/2001 | Hull et al. |
| 2002/0010661 A1 | 1/2002 | Waddington et al. |
| 2002/0065839 A1 | 5/2002 | McCulloch |
| 2002/0072988 A1 | 6/2002 | Aram |
| 2002/0087384 A1 | 7/2002 | Neifeld |
| 2002/0091595 A1 | 7/2002 | Itoi et al. |
| 2002/0133368 A1 | 9/2002 | Strutt et al. |
| 2002/0147656 A1 | 10/2002 | Tam et al. |
| 2002/0161670 A1 | 10/2002 | Walker et al. |
| 2002/0188579 A1 | 12/2002 | Liu et al. |
| 2003/0006098 A1 | 1/2003 | Wike, Jr. et al. |
| 2003/0018701 A1 | 1/2003 | Kaestle et al. |
| 2003/0026404 A1 | 2/2003 | Joyce et al. |
| 2003/0033179 A1 | 2/2003 | Katz et al. |
| 2003/0046133 A1 | 3/2003 | Morley et al. |
| 2003/0101454 A1 | 5/2003 | Ozer et al. |
| 2003/0135463 A1 | 7/2003 | Brown et al. |
| 2003/0151821 A1 | 8/2003 | Favalora et al. |
| 2003/0163399 A1* | 8/2003 | Harper ................... G06Q 10/10 |
| | | 705/35 |
| 2003/0171996 A1 | 9/2003 | Chen et al. |
| 2003/0216969 A1 | 11/2003 | Bauer et al. |
| 2004/0019552 A1 | 1/2004 | Tobin |
| 2004/0034570 A1 | 2/2004 | Davis |
| 2004/0039639 A1 | 2/2004 | Walker et al. |
| 2004/0073485 A1 | 4/2004 | Liu et al. |
| 2004/0098311 A1 | 5/2004 | Nair et al. |
| 2004/0153359 A1 | 8/2004 | Ho et al. |
| 2004/0181753 A1 | 9/2004 | Michaelides |
| 2004/0186783 A1 | 9/2004 | Knight et al. |
| 2004/0267640 A1 | 12/2004 | Bong et al. |
| 2005/0144066 A1 | 6/2005 | Cope et al. |
| 2005/0149414 A1 | 7/2005 | Schrodt et al. |
| 2005/0171841 A1 | 8/2005 | Prorock et al. |
| 2005/0197954 A1 | 9/2005 | Maitland et al. |
| 2005/0250555 A1 | 11/2005 | Richardson et al. |
| 2005/0273377 A1 | 12/2005 | Ouimet et al. |
| 2006/0031085 A1 | 2/2006 | Postel et al. |
| 2006/0036748 A1 | 2/2006 | Nusbaum et al. |
| 2006/0041457 A1 | 2/2006 | Mueller et al. |
| 2006/0106699 A1 | 5/2006 | Hitalenko et al. |
| 2006/0136345 A1 | 6/2006 | Jones et al. |
| 2006/0195385 A1 | 8/2006 | Khetrapal et al. |
| 2006/0195563 A1 | 8/2006 | Chapin et al. |
| 2006/0224470 A1 | 10/2006 | Garcia Ruano et al. |
| 2006/0235726 A1 | 10/2006 | Paraison et al. |
| 2006/0235739 A1 | 10/2006 | Levis et al. |
| 2006/0253330 A1 | 11/2006 | Maggio et al. |
| 2007/0124221 A1 | 5/2007 | Itoi et al. |
| 2007/0192198 A1 | 8/2007 | Schwarz |
| 2007/0244765 A1 | 10/2007 | Hunter et al. |
| 2008/0046446 A1 | 2/2008 | Sundararajan et al. |
| 2008/0065490 A1 | 3/2008 | Novick et al. |
| 2008/0077459 A1 | 3/2008 | Desai et al. |
| 2008/0082427 A1 | 4/2008 | Gandhi et al. |
| 2008/0103846 A1 | 5/2008 | Armstrong et al. |
| 2008/0120206 A1 | 5/2008 | Weiler et al. |
| 2008/0147507 A1 | 6/2008 | Langhammer |
| 2008/0154714 A1 | 6/2008 | Liu et al. |
| 2008/0191881 A1 | 8/2008 | Minerley |
| 2008/0198761 A1 | 8/2008 | Murawski et al. |
| 2008/0201232 A1 | 8/2008 | Walker et al. |
| 2008/0208688 A1 | 8/2008 | Byerley et al. |
| 2008/0216001 A1 | 9/2008 | Ording et al. |
| 2008/0228582 A1 | 9/2008 | Fordyce et al. |

(56) References Cited

U.S. PATENT DOCUMENTS

| | | |
|---|---|---|
| 2008/0249837 A1 | 10/2008 | Angell et al. |
| 2008/0281792 A1 | 11/2008 | Pickett et al. |
| 2008/0301095 A1 | 12/2008 | Zhu et al. |
| 2009/0028183 A1 | 1/2009 | Anders et al. |
| 2009/0030798 A1 | 1/2009 | Otto et al. |
| 2009/0089148 A1 | 4/2009 | Gujjar et al. |
| 2009/0138365 A1 | 5/2009 | Mueller et al. |
| 2009/0171754 A1* | 7/2009 | Kane .............. G06F 16/9535 715/744 |
| 2009/0222337 A1 | 9/2009 | Sergiades |
| 2009/0299794 A1 | 12/2009 | Marchi et al. |
| 2010/0057628 A1 | 3/2010 | Trinidad et al. |
| 2010/0086107 A1 | 4/2010 | Tzruya |
| 2010/0138037 A1 | 6/2010 | Adelberg et al. |
| 2010/0169130 A1 | 7/2010 | Fineman et al. |
| 2010/0174596 A1 | 7/2010 | Gilman et al. |
| 2010/0177343 A1 | 7/2010 | Shapiro et al. |
| 2010/0234986 A1 | 9/2010 | Clopton et al. |
| 2010/0274669 A1 | 10/2010 | Carlson |
| 2011/0010448 A1 | 1/2011 | Gill et al. |
| 2011/0011931 A1 | 1/2011 | Farley et al. |
| 2011/0019239 A1 | 1/2011 | Kojima et al. |
| 2011/0034722 A1 | 2/2011 | Muroi et al. |
| 2011/0042008 A1 | 2/2011 | Hori et al. |
| 2011/0047022 A1 | 2/2011 | Walker et al. |
| 2011/0054649 A1 | 3/2011 | Sarkis et al. |
| 2011/0054992 A1 | 3/2011 | Liberty et al. |
| 2011/0066504 A1 | 3/2011 | Chatow et al. |
| 2011/0082734 A1 | 4/2011 | Zhang et al. |
| 2011/0099061 A1 | 4/2011 | Giffin et al. |
| 2011/0106605 A1 | 5/2011 | Malik et al. |
| 2011/0125566 A1 | 5/2011 | Mclaughlin et al. |
| 2011/0137689 A1 | 6/2011 | Chua et al. |
| 2011/0178899 A1 | 7/2011 | Huszar |
| 2011/0191239 A1 | 8/2011 | Blackhurst et al. |
| 2011/0191861 A1 | 8/2011 | Spears |
| 2011/0213644 A1 | 9/2011 | Phene |
| 2011/0225023 A1 | 9/2011 | Evens et al. |
| 2011/0238577 A1 | 9/2011 | Shuster |
| 2011/0258083 A1 | 10/2011 | Ren |
| 2011/0258117 A1 | 10/2011 | Ahmad et al. |
| 2011/0259672 A1 | 10/2011 | Kuo |
| 2011/0313840 A1 | 12/2011 | Mason et al. |
| 2011/0320248 A1 | 12/2011 | Gorelik et al. |
| 2012/0016738 A1 | 1/2012 | Ouimet |
| 2012/0016758 A1 | 1/2012 | Bouaziz et al. |
| 2012/0041675 A1 | 2/2012 | Juliver et al. |
| 2012/0054076 A1 | 3/2012 | Wu et al. |
| 2012/0084119 A1 | 4/2012 | Vandehey et al. |
| 2012/0095882 A1 | 4/2012 | Wolff |
| 2012/0116810 A1 | 5/2012 | Knowlton et al. |
| 2012/0143666 A1 | 6/2012 | Carrior et al. |
| 2012/0209661 A1 | 8/2012 | Bennett et al. |
| 2012/0209673 A1 | 8/2012 | Park |
| 2012/0265590 A1 | 10/2012 | Mesaros |
| 2012/0290349 A1* | 11/2012 | Burkhart .............. G06Q 30/06 705/7.13 |
| 2012/0311723 A1 | 12/2012 | Britt, Jr. et al. |
| 2013/0006742 A1 | 1/2013 | Richard |
| 2013/0006776 A1 | 1/2013 | Miller et al. |
| 2013/0031006 A1 | 1/2013 | Mccullagh et al. |
| 2013/0046634 A1 | 2/2013 | Grigg et al. |
| 2013/0066698 A1 | 3/2013 | Levy et al. |
| 2013/0066733 A1 | 3/2013 | Levy et al. |
| 2013/0124360 A1 | 5/2013 | Mitrovic |
| 2013/0126610 A1 | 5/2013 | Aihara et al. |
| 2013/0132180 A1 | 5/2013 | Aihara et al. |
| 2013/0132193 A1 | 5/2013 | Aihara et al. |
| 2013/0132218 A1 | 5/2013 | Aihara et al. |
| 2013/0166332 A1 | 6/2013 | Hammad |
| 2013/0169413 A1 | 7/2013 | Schuessler |
| 2013/0173435 A1 | 7/2013 | Cozad, Jr. |
| 2013/0204697 A1 | 8/2013 | Boal |
| 2013/0246176 A1 | 9/2013 | Chang et al. |
| 2013/0262204 A1 | 10/2013 | Stiles et al. |
| 2013/0262211 A1 | 10/2013 | Tomlin et al. |
| 2013/0282392 A1 | 10/2013 | Wurm |
| 2013/0290234 A1 | 10/2013 | Harris et al. |
| 2013/0311211 A1 | 11/2013 | Zafar et al. |
| 2013/0325672 A1 | 12/2013 | Odenheimer et al. |
| 2014/0012704 A1 | 1/2014 | Mizhen et al. |
| 2014/0025524 A1 | 1/2014 | Sims et al. |
| 2014/0046748 A1 | 2/2014 | Nagarajan et al. |
| 2014/0058841 A1 | 2/2014 | Getchius |
| 2014/0067596 A1 | 3/2014 | McGovern et al. |
| 2014/0067677 A1 | 3/2014 | Ali et al. |
| 2014/0089133 A1 | 3/2014 | Argue et al. |
| 2014/0122195 A1 | 5/2014 | Tabor et al. |
| 2014/0122229 A1* | 5/2014 | Clark .............. G06Q 30/0631 705/14.66 |
| 2014/0129313 A1 | 5/2014 | Rappoport et al. |
| 2014/0149201 A1 | 5/2014 | Abbott et al. |
| 2014/0156449 A1 | 6/2014 | Ganesan et al. |
| 2014/0164063 A1 | 6/2014 | Delrahim et al. |
| 2014/0164093 A1 | 6/2014 | Libman |
| 2014/0164126 A1 | 6/2014 | Nicholas et al. |
| 2014/0172627 A1 | 6/2014 | Levy et al. |
| 2014/0173020 A1 | 6/2014 | Reilly et al. |
| 2014/0180826 A1 | 6/2014 | Boal |
| 2014/0180867 A1 | 6/2014 | Zises |
| 2014/0180959 A1 | 6/2014 | Gillen et al. |
| 2014/0195921 A1 | 7/2014 | Grosz et al. |
| 2014/0214562 A1 | 7/2014 | Cancro et al. |
| 2014/0214572 A1 | 7/2014 | Cancro et al. |
| 2014/0222711 A1 | 8/2014 | Tibbs et al. |
| 2014/0240725 A1 | 8/2014 | Banfield et al. |
| 2014/0244416 A1 | 8/2014 | Venkat et al. |
| 2014/0249941 A1 | 9/2014 | Hicks et al. |
| 2014/0278883 A1 | 9/2014 | Wang et al. |
| 2014/0279035 A1 | 9/2014 | Fleming et al. |
| 2014/0279116 A1 | 9/2014 | Vasquez et al. |
| 2014/0279204 A1 | 9/2014 | Roketenetz et al. |
| 2014/0279241 A1 | 9/2014 | Bartholomew et al. |
| 2014/0297470 A1 | 10/2014 | Ramadge et al. |
| 2014/0330685 A1 | 11/2014 | Nazzari |
| 2014/0344093 A1 | 11/2014 | Du et al. |
| 2014/0344118 A1 | 11/2014 | Parpia et al. |
| 2015/0026006 A1 | 1/2015 | Jackson et al. |
| 2015/0051994 A1 | 2/2015 | Ward et al. |
| 2015/0066671 A1 | 3/2015 | Nichols et al. |
| 2015/0081343 A1 | 3/2015 | Streebin |
| 2015/0088607 A1 | 3/2015 | Georgoff et al. |
| 2015/0095091 A1 | 4/2015 | Kamdar |
| 2015/0095191 A1 | 4/2015 | Hu |
| 2015/0095203 A1 | 4/2015 | Howe |
| 2015/0100433 A1 | 4/2015 | Choy et al. |
| 2015/0134431 A1 | 5/2015 | Georgoff et al. |
| 2015/0134552 A1 | 5/2015 | Engels et al. |
| 2015/0161564 A1 | 6/2015 | Sweeney et al. |
| 2015/0161645 A1 | 6/2015 | Unser et al. |
| 2015/0161714 A1 | 6/2015 | Fainshtein |
| 2015/0178654 A1 | 6/2015 | Glasgow et al. |
| 2015/0227975 A1 | 8/2015 | Momin et al. |
| 2015/0269521 A1 | 9/2015 | Knapp et al. |
| 2015/0269642 A1 | 9/2015 | Cai et al. |
| 2015/0278912 A1 | 10/2015 | Melcher et al. |
| 2015/0302510 A1 | 10/2015 | Godsey et al. |
| 2015/0310383 A1 | 10/2015 | Iser et al. |
| 2015/0310397 A1 | 10/2015 | Xu |
| 2015/0332414 A1 | 11/2015 | Unser et al. |
| 2015/0379514 A1 | 12/2015 | Poole |
| 2016/0063563 A1 | 3/2016 | Abad et al. |
| 2016/0086222 A1 | 3/2016 | Kurapati |
| 2016/0092827 A1 | 3/2016 | Colodny et al. |
| 2016/0247177 A1 | 8/2016 | Zamer |
| 2016/0267533 A1 | 9/2016 | Seth et al. |
| 2016/0275424 A1 | 9/2016 | Concannon et al. |
| 2016/0300257 A1 | 10/2016 | Triano et al. |
| 2016/0321677 A1 | 11/2016 | Dobaj |
| 2017/0011423 A1 | 1/2017 | Douglas et al. |
| 2017/0032382 A1 | 2/2017 | Shulman et al. |
| 2017/0236152 A1 | 8/2017 | Dimaunahan et al. |

(56) References Cited

U.S. PATENT DOCUMENTS

| | | |
|---|---|---|
| 2017/0286985 A1 | 10/2017 | Slavin et al. |
| 2017/0293982 A1 | 10/2017 | Gupta et al. |
| 2017/0345105 A1 | 11/2017 | Isaacson et al. |
| 2018/0012257 A1 | 1/2018 | Grimes |
| 2018/0025442 A1 | 1/2018 | Isaacson et al. |
| 2018/0047083 A1 | 2/2018 | Agarwal et al. |
| 2018/0150387 A1 | 5/2018 | Kogan et al. |
| 2018/0204256 A1 | 7/2018 | Bifolco et al. |
| 2018/0232817 A1 | 8/2018 | Isaacson et al. |
| 2018/0315111 A1 | 11/2018 | Alvo et al. |
| 2018/0365753 A1 | 12/2018 | Fredrich et al. |
| 2019/0272497 A1 | 9/2019 | Tingler et al. |
| 2019/0295148 A1 | 9/2019 | Lefkow et al. |
| 2019/0310126 A1 | 10/2019 | Gurumohan et al. |
| 2020/0005347 A1 | 1/2020 | Boal |
| 2021/0019805 A1 | 1/2021 | Kumar et al. |
| 2022/0245665 A1 | 8/2022 | Voss et al. |
| 2022/0398625 A1 | 12/2022 | Bebawy et al. |
| 2024/0232984 A1 | 7/2024 | Kumar et al. |

OTHER PUBLICATIONS

Cox, J.F., III, and Walker, E.D., II, "The Poker Chip Game: A Multi-product, Multi-customer, Multi-echelon, Stochastic Supply Chain Network Useful for Teaching the Impacts of Pull versus Push Inventory Policies on Link and Chain Performance," INFORMS Transactions on Education, vol. 6, Issue 3, pp. 3-19 (May 1, 2006).

Ross, D.F., "Replenishment Inventory Planning," Chapter 7 of Distribution Planning and Control: Managing in the Era of Supply Chain Management, Chapman & Hall, pp. 263-319 (1996).

Wah, B.W., "Wiley Encyclopedia of Computer Science and Engineering," Wiley-Interscience, vol. 1, pp. 1-230 (Nov. 2008).

Caldeira et al., "Characterizing and Evaluating Fraud in Electronic Transactions," 2012 Eighth Latin American Web Congress, Cartagena, Colombia, 2012, pp. 115-122, doi: 10.1109/LA-WEB.2012.16.

Davenport, T.H., et al., "Know What Your Customers Want Before They Do", Harvard Business Review Magazine, Dec. 2011, 14 pages.

Ehmke et al., "Estimating Breakeven Sales for Your Small Business", Department of Agricultural Economics, New Ventures Purdue Extension, Jul. 22, 2009, 4 pages.

* cited by examiner

TRANSACTION MODIFICATION BASED ON MODELED PROFILES

RELATED APPLICATIONS

This application claims priority to and is a continuation of U.S. patent application Ser. No. 17/065,072, filed on Oct. 7, 2020, which is a continuation of U.S. patent application Ser. No. 16/369,455, filed on Mar. 29, 2019, now U.S. Pat. No. 10,304,117, which issued on Oct. 20, 2020, which is a continuation of U.S. patent application Ser. No. 15/445,619, filed on Feb. 28, 2017, now U.S. Pat. No. 10,304,117, which issued on May 28, 2019, which is a continuation of and claims priority to U.S. patent application Ser. No. 14/289,469, filed May 28, 2014, now U.S. Pat. No. 9,619,831, which issued on Apr. 11, 2017, which claims the benefit of U.S. Provisional Patent Application No. 61/969,720, filed Mar. 24, 2014, all of which are incorporated herein by reference in their entireties.

BACKGROUND

People conduct transactions with many different merchants for acquiring many different types of goods and services. Merchants, who are purveyors of these goods and services, often perform transactions in person with their customers at a point of sale location. However, such merchants may have very little access to information about the overall shopping habits of their customers, and even less access to information about the shopping habits of potential customers. Accordingly, it can be difficult for merchants to obtain information that could assist the merchants in growing and improving their businesses, such as information related to goods and services that their customers are likely to purchase together.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
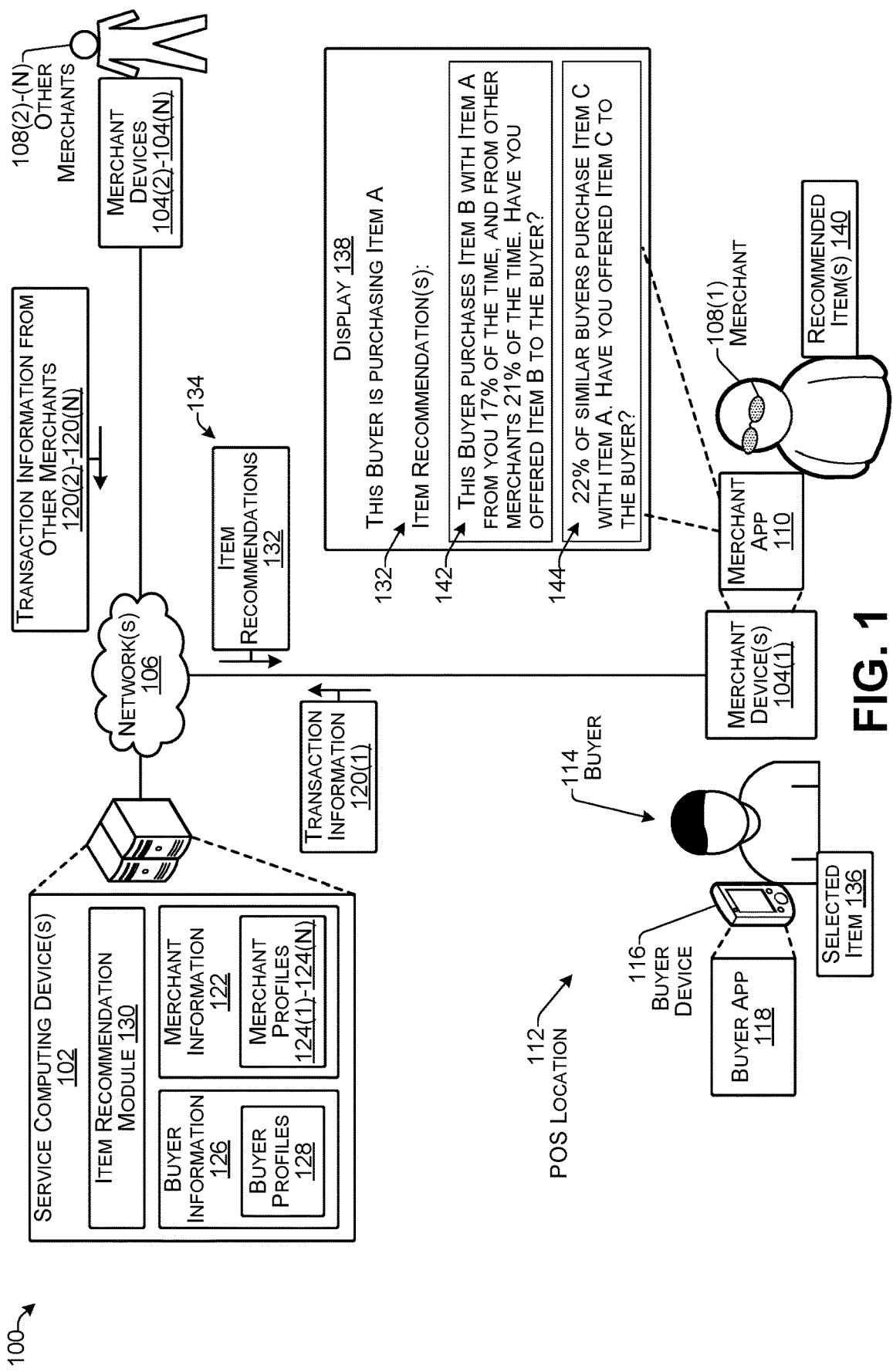
FIG. 1 illustrates an example environment for a payment and item recommendation service according to some implementations.

Some implementations described herein include techniques and arrangements for providing item recommendations to a merchant based on point of sale (POS) transaction information received from the merchant and/or from other merchants. For example, a service provider may provide a payment and item recommendation service to merchants and buyers to enable transactions between the merchants and the buyers at POS locations. As used herein, a transaction may include a financial transaction for the acquisition of goods and/or services (referred to herein as items) that is conducted between a buyer (e.g., a customer) and a merchant, such as at a POS location. In some examples, during a transaction, or in anticipation of a transaction, the service provider may send an item recommendation to a merchant device associated with a merchant to recommend one or more items for the merchant to offer to a buyer, such as for cross-selling, up-selling, bundling, or the like.

In some instances, cross-selling may include inviting a customer to spend more money by adding an additional item to a first item that the customer has already selected for purchase. For instance, the added item may be from an item category that is different from that of the first item, but which might be considered an accompaniment to the first item or related to the first item. As one example, if a customer has ordered a cup of coffee, the merchant may offer a donut with the coffee as a cross-sell suggestion. Similarly, up-selling may include inviting a customer to spend more money on an item selected by the customer, such as to buy a more expensive model of the same type of item, adding optional features to the selected item, adding a warranty, and so forth. As one example, if the customer has selected a portable media player for purchase, an up-sell would be to offer the customer the same brand or a different brand of media player that has more memory for a higher price. Bundling is similar to cross selling and up-selling, and may involve offering two or more related items for sale together at a discounted price, to thereby entice the buyer to consider purchasing the two or more items together.

Furthermore, when paying for a transaction, a buyer can provide the payment that is due to the merchant using any of cash, a check, a payment card, or an electronic payment account, such as may be accessed using a buyer device carried by the buyer. The merchant can interact with a POS computing device, i.e., a merchant device, to process the transaction. During the transaction, the merchant device can send, to the service provider, transaction information describing the transaction, such as a description of the item(s) selected by the buyer, price(s) of the item(s) selected, a time, place and date of the transaction, and so forth. In addition, the merchant device can often include buyer identifying information with the transaction information sent to the service provider. For instance, buyer identifying information may be determined from a payment card of the current buyer, from an electronic payment account of the current buyer, from a merchant club membership for which the current buyer has signed up, or the like.

Accordingly, in some examples herein, when a buyer is participating in a current POS transaction with a merchant, the service provider may receive transaction information about the current POS transaction from a merchant device associated with the merchant. The received transaction information may identify an item selected by the buyer, and in some cases may include buyer identifying information. In response to receiving the transaction information, the service provider may determine one or more additional items for the merchant to offer to the buyer.

As one example, suppose that a buyer has selected a first item for purchase, such as a cup of coffee. As the transaction is taking place, the service provider may receive the transaction information that identifies the buyer and the first item selected by the buyer as cup of coffee. Based at least in part on the received transaction information, the service provider may determine one or more additional items that the merchant can offer to the buyer and that the buyer may be likely to purchase. The service provider may send an item recommendation to the merchant regarding the one or more additional items. The item recommendation may be presented on the merchant device so that the merchant can offer the one or more additional items to the buyer prior to completion of the transaction.

In some instances, the one or more additional items may be targeted to the particular buyer such that there is a greater than normal likelihood that the buyer will buy the one or more additional items with the first item in the same transaction. As an example, the service provider may determine from a transaction history in a buyer profile associated with the particular buyer whether the particular buyer has bought any other items with the first item in the past. Further, the service provider may refer to a list of items offered by the merchant to determine whether any of the items bought by the particular buyer with the first item in the past are offered by the merchant participating in the current transaction. If so, the service provider may recommend one or more of the other items to the merchant as a cross-sell, up-sell or bundle opportunity.

As an example, suppose that the buyer's transaction history shows that the buyer has purchased a blueberry muffin with a cup of coffee at one or more other merchants 11% of the time, and has purchased a glazed donut with a cup of coffee at one or more other merchants 14% of the time. The merchant's list of available items offered may show that the merchant offers blueberry muffins, but does not offer glazed donuts. Accordingly, the service provider may send an item recommendation to the merchant for presentation on the merchant device in near real time, e.g., before the transaction is completed. The item recommendation may recommend that the merchant offer to sell a blueberry muffin to the buyer to accompany the cup of coffee the buyer has already selected. Further, since the comparison with the list of available items offered for sale by the merchant indicates that this particular merchant does not offer glazed donuts, the item recommendation may not include a recommendation for a glazed donut or other items that the merchant does not currently offer.

As another example, suppose that, from the current transaction information, the service provider is not able to identify a buyer profile corresponding to the particular buyer participating in the current transaction. For instance, the service provider may not have a buyer profile that matches buyer information received with the transaction information for the current transaction, or alternatively, the buyer may be paying with cash and has not otherwise provided any buyer information. In either case, when the service provider cannot determine a buyer profile corresponding to the buyer participating in the current transaction, the service provider may refer to a transaction history for the merchant to determine one or more items that have sold well with the selected item among the merchant's recent customers. Additionally or alternatively, the service provider may refer to transaction histories for similar merchants.

Based at least in part on the transaction history for the current merchant and/or transaction histories for similar merchants, the service provider may send to the merchant device a recommendation that the merchant offer one or more additional items to the particular customer based at least in part on the first item that the customer has already selected. For example, suppose that a customer has selected nail polish as an item for purchase. The transaction history for the current merchant may be obtained from a plurality of buyer profiles of buyers that have conducted at least one transaction with the merchant. Alternatively, the transaction history for the current merchant may be obtained directly from a merchant profile for the current merchant maintained by the service provider. Still alternatively, transaction histories for POS transactions at a plurality of merchants similar to the current merchant, such as classified in the same category as the current merchant, may be accessed to determine items bought together with nail polish. Additionally, in some cases, other transaction information in the transaction histories may also be taken into consideration, such as date and time of day of the transactions, overall amount being spent, locations of the transactions, and so forth.

Suppose the transaction history for the current merchant and/or the transaction histories for similar merchants show that buyers often purchase nail polish remover and/or cotton balls when purchasing nail polish. Consequently, the service provider may determine, e.g., from a list of items that the merchant offers for sale, that the first merchant has nail polish remover and cotton balls available for sale. Based on this determination, the service provider may send an item recommendation to the merchant device to recommend that the merchant offer at least one of nail polish remover or cotton balls to the particular buyer as part of the transaction for the nail polish. Thus, the merchant device may receive, from the service provider, a list of one or more additional items offered by the merchant that have sold well (e.g., with more than a threshold frequency) with the item that the current customer has already selected. The merchant device may present this list on a display associated with the merchant device to enable the merchant to offer the one or more additional items to the buyer before the transaction is completed.

In some instances, rather than sending the item recommendation to the merchant device in near real time, e.g., before the transaction is completed, the service provider may determine in advance items for the merchant to offer together. For example, the predetermined item recommendations may be stored on the merchant device or at a storage location accessible to the merchant device. Further, in some cases, the predetermined item recommendations that are provided in advance may be used to offer bundles, i.e., two or more items offered for sale together at a discount if the buyer purchases all of the items in the bundle in a single transaction. Accordingly, the item recommendations may be presented on the merchant device by a merchant application without having to send transaction information to the service provider, which may decrease the response time for presentation of the item recommendations to the merchant as each transaction is being conducted and/or which may enable the merchant device to present recommendations when operating in an offline mode. The predetermined item recommendations may be periodically updated by the service provider based on newly received transaction information received from the particular merchant and/or from other merchants.

The service provider may continually receive transaction information from a plurality of merchants, and may organize the transaction information into merchant profiles and buyer profiles. For example, a single buyer profile may include transaction information for a plurality transactions conducted by the corresponding buyer with various different merchants. The transaction information from a plurality of buyer profiles can be aggregated and analyzed to determine characteristics of buyers that are customers or potential customers of a particular merchant, and to determine which items particular buyers or types of buyers have purchased together, or may be likely to purchase together during a single transaction. The service provider may provide item recommendations to a merchant that are targeted or otherwise personalized for a particular buyer or type of buyer based on an examination of the transaction information in the buyer profiles. In some cases, the item recommendations may be made in near real time for a transaction currently taking place at the merchant's POS location. In other cases, the item recommendations may be provided to the merchant in advance of a transaction.

For discussion purposes, some example implementations are described in the environment of a service computing device that makes targeted item recommendations to merchants based on analysis of transaction information and/or buyer profiles. However, implementations herein are not limited to the particular examples provided, and may be extended to other environments, other system architectures, other types of merchants, and so forth, as will be apparent to those of skill in the art in light of the disclosure herein.

FIG. 1 illustrates an example environment 100 for a payment and item recommendation service according to some implementations. For instance, the environment 100 may enable a service provider to provide item recommendations to a merchant to assist the merchant in selling additional items to a buyer. In the illustrated example, one or more service computing devices 102 of the service provider are able to communicate with one or more merchant devices 104 over one or more networks 106. Further, each merchant device 104 may be associated with a merchant 108. For example, one or more first merchant devices 104(1) may be associated with a first merchant 108(1). Further, other merchant devices 104(2)-104(N) may be associated with other merchants 108(2)-108(N). Each merchant device 104 may include an instance of a merchant application 110 that executes on a respective merchant device 104. The merchant application 110 may provide POS functionality to the merchant device 104 to enable the merchant 108 to accept payments at a POS location from one or more buyers 114. For example, the first merchant 108(1) may use a first merchant device 104(1) to accept payments at a first POS location 112 from a buyer 114. In some types of businesses, the POS location 112 may correspond to a store or other place of business of the merchant, and thus, may be a fixed location that typically does not change on a day-to-day basis. In other types of businesses, however, the POS location 112 may change from time to time, such as in the case that the merchant operates a food truck, is a street vendor, a cab driver, etc., or has an otherwise mobile business, e.g., in the case of merchants who sell items at buyer's homes, places of business, and so forth.

As used herein, a merchant may include any business engaged in the offering of goods or services for acquisition by buyers in exchange for compensation received from the buyers. Actions attributed to a merchant herein may include actions performed by employees or other agents of the merchant and, thus, no distinction is made herein between merchants and their employees unless specifically discussed. In addition, as used herein, a buyer may include any entity that acquires goods or services from a merchant, such as by purchasing, renting, leasing, borrowing, licensing, or the like. Hereinafter, goods and/or services offered by merchants may be referred to as items. Thus, a merchant and a buyer may interact with each other to conduct a transaction in which the buyer acquires one or more items from a merchant, and in return, the buyer provides payment to the merchant.

In this example, the buyer 114 has a buyer device 116 that may execute a buyer application 118. For instance, some buyers 114 may carry buyer devices 116, such as smart phones, tablet computers, wearable computing devices, or the like, as further enumerated elsewhere herein, and some of these buyer devices 116 may have installed thereon the buyer application 118. The buyer application 118 may include electronic payment capability, which enables the buyer 114 to make a payment to the merchant using the buyer application 118, rather than paying with a physical payment card, cash, check, etc. The buyer application 118 may further enable the buyer 114 to check in with the merchant, e.g., at the merchant's store or prior to entering the merchant's store, such as to place an order for an item. As one example, the buyer 114 may be able to place an order for an item through the buyer application 118, may skip waiting in a line for ordering items, may pay for the transaction using the buyer application 118, and may proceed directly to an area of the merchant's store to pick up the ordered item.

In the example of FIG. 1, suppose that the buyer 114 is conducting a transaction with the merchant 108(1) to purchase an item at the POS location 112. The merchant application 110 on the merchant device 104(1) may send first transaction information 120(1) to the service computing device 102, and typically, may send the first transaction information 120(1) as the transaction is being conducted at the point of sale location 112. For instance, the transaction information 120 may be sent by each of the merchant devices 104 as each transaction is conducted. Of course, in other examples, such as if the merchant is processing transactions offline, the transaction information 120 may be sent in a batch at a subsequent point in time or using other suitable techniques.

The transaction information 120 may include information regarding the time, place, and the amount of the transaction, information related to the item acquired, a type of payment being used (e.g., cash, check, payment card, electronic payment), as well as additional information, such as buyer information. For instance if a payment card is used, the transaction information 120 can include data stored in the payment card, e.g., Track 1 data (cardholder name, card number and other card information). In addition, when completing the transaction a buyer may sometimes provide a receipt email address for receiving a receipt through email. Other examples of transaction information 120 that can be captured include item information, e.g., an itemized listing of the items being acquired, the price being paid for each item, descriptors of the items (size, flavor, color, etc.), geolocation data indicating a geographic POS location of a particular transaction, online/offline card data, data describing the merchant, e.g., a merchant identifier, a merchant category code (MCC), any type of data that is received upon a buyer's authentication into a social network, if any, and various other types of information, as discussed additionally below.

The service computing device 102 may also receive transaction information 120 from the plurality of other merchants 108. For example, a large number of other merchants 108(2)-108(N) may also operate their own merchant devices 104(2)-104(N), respectively, for conducting transactions with respect to their own businesses. Accordingly, transaction information 120(2)-120(N) from the merchant devices 104(2)-104(N) associated with the other merchants 108(2)-108(N) may also be provided to the service computing device 102.

As discussed additionally below, the service computing device 102 may receive the transaction information 120 and may associate the transaction information 120 with merchant information 122 maintained by the service computing device 102. For example, the first transaction information 120(1) may be associated with a first merchant profile 124(1) corresponding to the first merchant 108(1), the Nth transaction information 120(N) may be associated with an Nth merchant profile 124(N) corresponding to an Nth merchant 108(N), and so forth.

In addition, buyer information 126 may be extracted from the transaction information 120 and may be associated with buyer profiles 128. For example, the transaction information 120 for a particular transaction may include a payment card identifier of the payment card that was used as a payment instrument, and may further include the name of the holder of the payment card that was used. Accordingly, a buyer profile 128 may be associated with an identifier of the payment card and/or the name corresponding to the holder of the payment card. Additional transaction information may be related to this buyer profile, such as the POS location of the transaction, the amount of the transaction, the time and date of the transaction, the item(s) acquired through the transaction, descriptive information about the item(s) acquired, the individual price paid for each item, and so forth.

The service computing device 102 may include an item recommendation module 130 that may analyze the merchant profiles 124 and/or the buyer profiles 128 for making item recommendations 132 to one or more of the merchants 108. The item recommendations 132 may recommend items for cross-selling, up-selling and/or bundling. In some implementations, the item recommendations 132 may be provided to the merchant device 104 in near real time, e.g., while the transaction is taking place. In other examples, the item recommendations 132 may be predetermined and provided in advance to the merchant device 104.

As one example, in response to the service computing device 102 receiving transaction information 120, such as from a payment card swipe, a buyer check in using an electronic payment option of the buyer application 118, or the like, the service computing device 102 may be able to identify the buyer 114 and may access a buyer profile 128 associated with the buyer. The buyer profile 128 may include the buyer's transaction history for transactions not only with the current merchant 108(1), but also with other merchants, including merchants that are categorized similarly to the current merchant 108(1). The service computing device 102 can determine, from the transaction history in the buyer's profile 128, one or more items that the merchant may offer as up-sell, cross-sell or bundle items. The service computing device 102 may send one or more item recommendations 132 in an electronic communication 134 to the merchant device 104(1). For example, the communication 134 may include a list of the one or more items determined by the service computing device 102 for the merchant 108(1) to recommend as an accompaniment to a selected item 136 already selected by the buyer 114.

In some cases, the merchant device 104(1) that is being used to conduct the current POS transaction may present the one or more item recommendations 132 in a pop-up window or at a designated location in a user interface (UI) presented on a display 138 associated with the merchant device 104(1). As indicated above, the item recommendation 132 may be based at least in part on information that the service provider already has about the particular buyer 114 in the buyer profile and about the selected item 136 that the particular buyer 114 is about to purchase. The item recommendations 132 may recommend one or more recommended items 140 for the merchant 108(1) to offer to sell to the buyer 114 and/or may recommend a bundle or incentive for the buyer 114 to purchase one or more recommended items with the selected item 136 already selected. For example, if the merchant 108 sells a first item plus one or more second items together, even at a bundle discount, the merchant 108 can obtain larger overall revenue, which can typically lead to greater overall profitability for the merchant.

In the example of FIG. 1, suppose that the buyer 114 has selected item A as the selected item 136. For instance, the buyer 114 may have used the buyer application 118 to check in with the merchant 108(1) and to select item A from a menu of items offered by the merchant 108(1). As another example, the buyer 114 may have entered the merchant's POS location 112, and may have picked up item A from a shelf, may have stood in a line to order item A, may have ordered item A from a waitperson, server, etc.

Furthermore, in some cases, buyer information may also be determined about the buyer 114 as the transaction is being conducted. For example, if the buyer 114 uses the buyer application 118 to order item A, the buyer 114 may be identified through a buyer profile associated with the buyer application 118. As another example, if the buyer 114 uses a payment card, such as by swiping the payment card at the time of checkout or when opening a tab, the service computing device 102 may receive the information from the payment card, such as a payment card identifier based on the payment card number and the name of a holder of the payment card. As still another example, if the merchant provides a club card or membership incentives, the buyer may provide identifying information based on such a program, which information may already be on file with the merchant, which may include identifying information, such as a phone number, or the like.

Suppose that the transaction information 120(1) includes buyer information that enables the service computing device 102 to associate the transaction information 120(1) with a particular buyer profile. Accordingly, the service computing device 102 may access a transaction history in the buyer profile to determine whether the particular buyer 114 has ever purchased the selected item 136, or, in some examples, an item in the same item category as the selected item 136.

Suppose the transaction history in the buyer profile 128 indicates that the buyer 114 has purchased the selected item 136, i.e., item A, a number of times from the merchant 108(1), and further, the buyer has purchased item B with item A in the same transaction 17% of the time at the merchant 108(1). Further, suppose that the transaction history indicates that the buyer 114 has purchased item B together with item A in the same transaction 21% of the time when purchasing item A from other merchants. Accordingly, the service computing device 102 may send a first recommendation 142 to the merchant 108(1) to inform the merchant 108(1) of these findings and to recommend the merchant 108(1) offer item B to the buyer 114.

In addition, the service computing device 102 may determine from the buyer profiles 128 a subset of the buyer profiles that share one or more common characteristics with the buyer profile of the buyer 114. For example, the subset may be selected based on one or more common demographic characteristics, such as: buyer residence information; buyer age; buyer sex; buyer affluence; buyer ethnicity; buyer language; buyer education; buyer marital status; buyer occupation; buyer religion; buyer political affiliation; buyer memberships in associations, and so forth. Additionally, or alternatively, the one or more common characteristics may be selected based on shopping habits, such as type of items that the buyers purchase, a time of day and day of the week on which purchases tend to be made, categories of merchants at which the buyers shop, average amount spent per transaction, and so forth.

As one example, suppose that the service computing device 102 determines, from the buyer profiles 128, a subset of the buyer profiles 128 that have a plurality of the above-listed characteristics that are similar to the buyer profile of the buyer 114. Further, supposed that comparison of the buyer profiles in the subset with each other shows that 22% of the buyers buy item C with item A when buying item A from either the merchant 108(1) or from other merchants. Accordingly, the service computing device 102 may send a second recommendation 144 to the merchant 108(1) to inform the merchant 108(1) of these findings and to recommend the merchant 108(1) offer item C to the buyer 114. Upon receiving the recommendations 1402 and 144, such as prior to completion of the transaction, the merchant 108(1) may ask the buyer 114 if the buyer would like to add item B and/or item C to the transaction.

In some cases, the merchant device 104(1) may be a portable device, such as may be carried by a waitperson or other server. For instance, in the case that the merchant device 104(1) is used by a server in a restaurant for taking customer orders, the item recommendations 132 may include recommendations for accompaniments for particular menu items ordered by a buyer. As one example, the merchant device 104(1) may present automatic recommendations for wine pairings or appetizers when the server enters a buyer's meal selection. As another example, if the merchant 108(1) desires to sell off unwanted inventory, the item recommendations 132 may indicate which buyers are likely to buy the particular inventory, which are likely to buy if offered a special deal or other incentive, and so forth.

In some implementations, the service computing device 102 may provide predetermined recommendations 132 to the merchant devices 104. For example, if the merchant device 104(1) is operating in an offline mode, the predetermined recommendations may be provided by the merchant application 110 executing on the merchant device 104(1). For instance, the predetermined recommendations may indicate which of the items offered by the merchant have been sold with each other with a frequency that is larger than a threshold frequency. According, in response to the buyer selecting item A, the merchant application 110 may present one or more recommendations for items that have sold well with item A in the past.

Additionally, in some examples, the communication 134 from the service computing device 102 may include an indication to the merchant 108(1) about one or more items that the merchant 108(1) could also have sold to this buyer 114, such as items not currently offered by the merchant 108(1). Accordingly, item recommendations 132 may be provided to the merchants 108 and targeted to particular buyers 114 based on analysis of the buyer profiles 128 and/or the merchant profiles 124, additional examples of which are discussed below.

Figure 2:
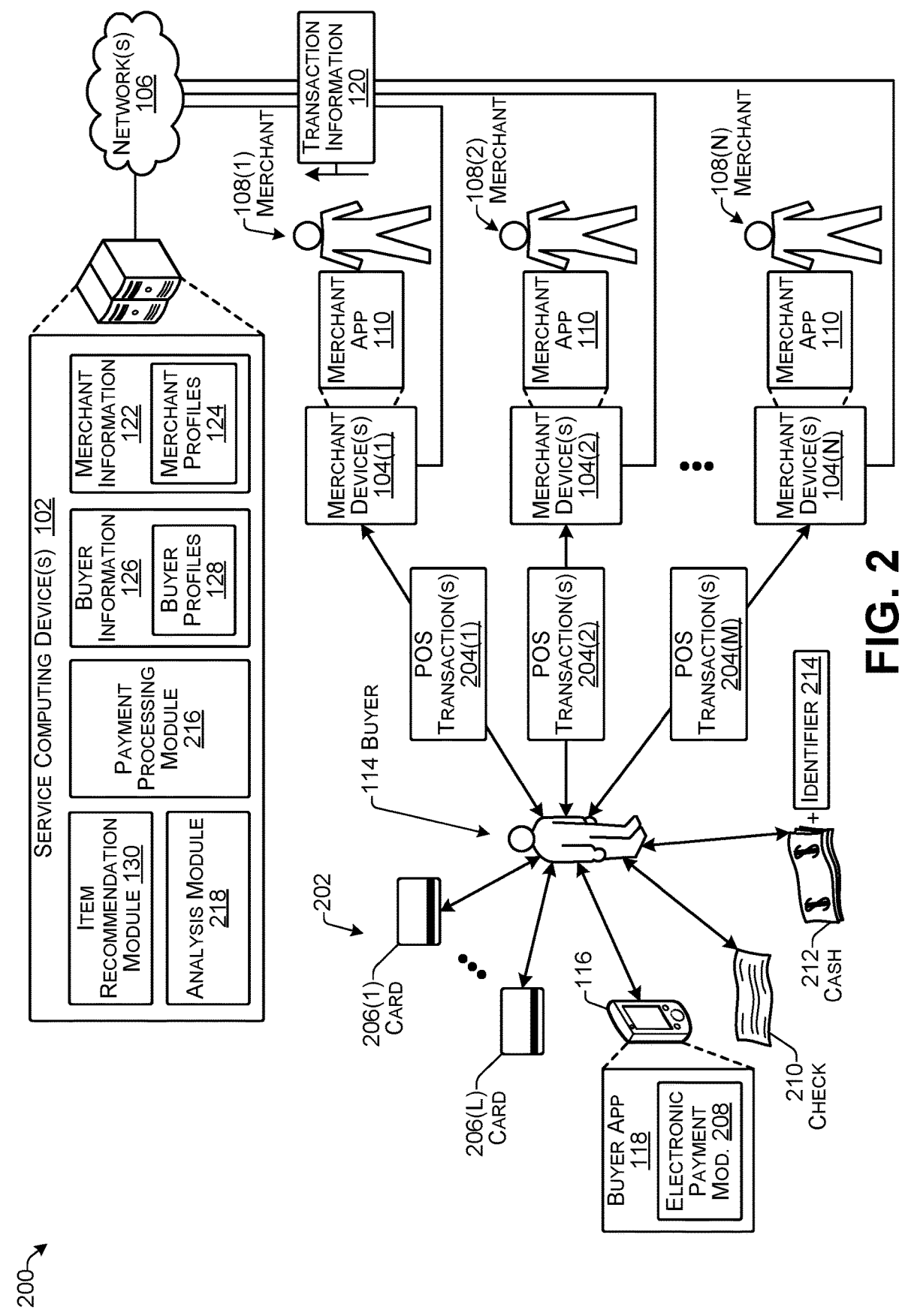
FIG. 2 illustrates an example environment for enabling point of sale transactions between merchants and buyers according to some implementations.

FIG. 2 illustrates an example environment 200 for enabling transactions between merchants and buyers according to some implementations. In this example, a buyer 114 may use any of a variety of different payment instruments 202 when participating in a plurality of POS transactions 204(1)-204(M) with a plurality of different merchants 108(1)-108(N). For example, a buyer may typically have a plurality of payment cards 206(1)-206(L), such as credit cards, debit cards, prepaid cards, and so forth, that the buyer 114 may use for conducting various different POS transactions 204. Further, in some examples, the payment cards 206 may include one or more magnetic strips for providing card and buyer information when swiped in a card reader. In other examples, other types of payment cards 206 may be used, such as smart cards having a built-in memory chip, a radiofrequency identification tag, and so forth.

A buyer 114 may select a particular payment card 206 for use at a particular POS location and/or for use with a particular merchant 108 for any of a variety of different reasons and may often use different payment cards. For example, the buyer 114 may not always use the same payment card 206 with the same merchant 108 for every POS transaction 204 conducted with that merchant 108. In such scenarios, the transaction information that describes transactions that are conducted using a first payment instruments 202 may be separate or disconnected from the transaction information 120 that describes other transactions conducted using a second payment instrument 202. Such disconnected sets of transaction information 120 can make it difficult to capture a holistic view of a buyer's shopping behavior and preferences. Thus, in some examples herein, various techniques may be used for matching transaction information corresponding to multiple different payment instruments to a single buyer profile. This enables creation of a single or more complete buyer profile to describe the shopping behavior of the corresponding particular buyer. Such buyer profiles 128 of respective buyers 114 can be aggregated and the information contained therein evaluated to provide merchants with data describing their customer base, and to provide the merchants with customized or otherwise personalized item recommendations and other types of information.

In addition to payment cards, a buyer 114 may carry a buyer device 116, as discussed above. The buyer device 116 may include the buyer application 118, which enables an associated electronic payment account to be used as a payment instrument 202. For example, the buyer application 118 may include an electronic payment module 208 that uses an electronic payment account of the buyer 114 for making electronic payments for transactions. In some cases, the electronic payment account of the buyer 114 may be linked to one of the buyer's payment cards 206, such as a credit card. Accordingly, the buyer application 118 may enable the buyer 114 to pay for a transaction with the linked credit card without having to produce the credit card, thereby enabling a card-less payment to the merchant with the credit card. The buyer application 118 and the corresponding electronic payment account, can be associated with various buyer information including, for example, the buyer's name, information describing the payment card linked to the electronic payment account, and an email address linked to the electronic payment account to which receipts can be sent for electronic payment transactions that are conducted by the buyer 114 using the buyer application 118. Further, as an alternative to linking the electronic payment account to a credit card, the electronic payment account may be a different type of account, such as a checking account, a debit account, a savings account, a prepaid account having a prepaid quantity of money deposited therein, or the like.

In addition to the above discussed payment instruments, the buyer 114 may also optionally pay with a check 210 or cash 212. For example, if the buyer 114 pays with check 210 or cash 212, the merchant may sometimes also receive an identifier 214 that provides additional identification information about the buyer 114. For instance, a merchant may have a club card or other incentive that enables identification of the buyer to the merchant and thereby to the merchant application 110. As an example, the buyer 114 may provide a telephone number associated with the buyer 114, and this telephone number along with other transaction information may be cross-referenced to a matching telephone number in an existing buyer profile 128 to associate the transaction with the existing buyer profile 128. Additionally, or alternatively, the buyer 114 may provide an email address in association with a particular transaction to receive a receipt for the transaction by email, rather than receiving a paper receipt, and the email address may be used to associate the transaction with an existing buyer profile 128. Alternatively, if the buyer 114 pays with a check 210, the buyer 114 may be required to provide buyer information in association with the check 210, which, in addition to a checking account number, may include telephone number, address, and other identification information. Accordingly, this information may also be associated with the particular transaction, and may thereby enable the transaction to be associated with an existing buyer profile 128. Furthermore, as discussed additionally below, if an existing buyer profile 128 that matches the transaction information for a new transaction cannot be located, a new buyer profile 128 may be created.

The service computing device 102 may include a payment processing module 216 that may receive at least transaction information 120 for processing payments made through the merchant application 110 and, in some cases, the buyer application 118. For example, the payment processing module 216 may receive transaction information 120, such as an amount of the transaction, and may verify that a particular payment card can be used to pay for the transaction, such as by contacting a card clearinghouse computing device or other bank computing device, as discussed additionally below. Furthermore, in some examples, the payment processing module 216 may redirect payment information for transactions to be made using payment cards 206 to a bank computing device (not shown in FIG. 2), while in other examples, the merchant devices 104 may communicate directly with an appropriate bank computing device for approving or denying a transaction using a particular payment card 206 for a particular transaction. Additional details of payment processing are discussed below.

The service computing device 102 may further include the analysis module 218 mentioned above. For example, the analysis module 218 may receive the transaction information 120 and associate the transaction information 120 with appropriate merchant profiles 124 and appropriate buyer profiles 128. Thus, as discussed additionally below, the analysis module 218 may compare received transaction information 120, which may include an identifier of the merchant device 104 or an identifier of an instance of a merchant application 110 from which the transaction information 120 is received for associating the transaction information 120 with a particular merchant profile 124. Furthermore, the analysis module 218 may extract buyer information such as credit card identifier, buyer name, buyer email address, and various other pieces of buyer information from the transaction information 120, and may match this information with an existing buyer profile 128. If no match is found, then a new buyer profile 128 may be created.

The buyer profiles 128 and/or merchant profiles 124 described herein may be created and maintained using any suitable types of data structures, and using any suitable data storage or database techniques. In some examples, the transaction information and other profile information may be maintained in a relational database in which pieces of information for individual buyer profiles may be stored distinctly from one another, but are related to or otherwise associated with each other in the relational database. For instance, a particular buyer profile 128 may be obtained by generating a view of a portion the data related in the database to the particular buyer profile, or by otherwise extracting the data from the database. Alternatively, of course, other types of storage techniques may be used for generating and maintaining the buyer profiles 128 and/or the merchant profiles 124. Furthermore, as discussed below, in some examples a probabilistic model may be used to determine within a threshold level of confidence that transaction information 120 from a particular transaction should be associated with a particular buyer profile 128.

Figure 3:
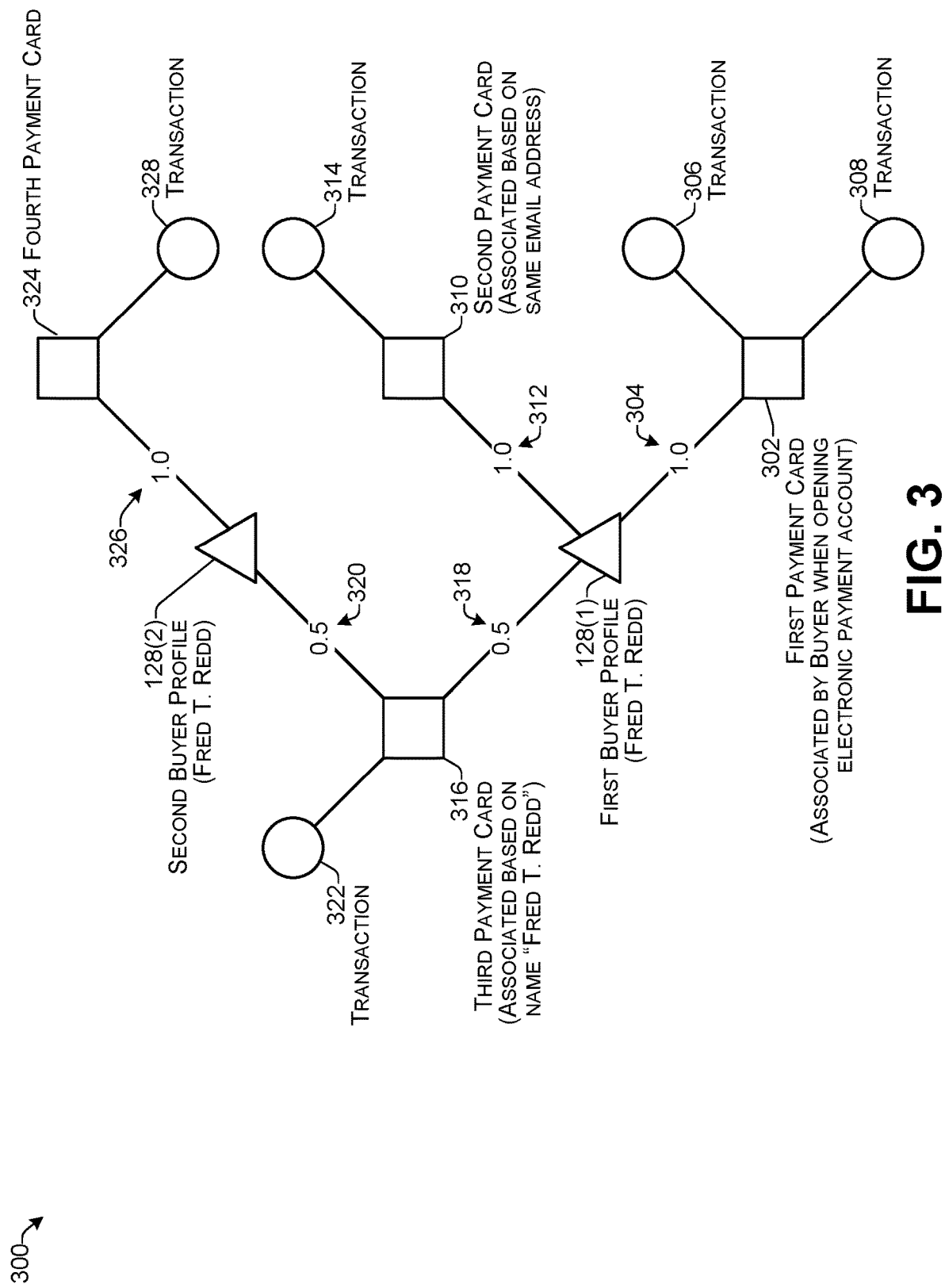
FIG. 3 illustrates an example probabilistic model for associating transactions with buyer profiles according to some implementations.

FIG. 3 illustrates an example probabilistic model 300 for associating transactions with buyer profiles according to some implementations. In this example, the probabilistic model 300 includes a weighted graph in which triangular nodes represent buyer profiles, such as a first buyer profile 128(1) and a second buyer profile 128(2), respectively. The probabilistic model 300 indicates the probabilities that particular transactions are associated with particular buyer profiles, such as based on buyer use of different payment instruments, as discussed above with respect to FIG. 2, and further based on the information included with each transaction and the information already included in each buyer profile 128. The probabilistic model 300 can be used to determine whether to associate a particular transaction with a particular buyer profile, and to determine when to merge buyer profiles 128 and/or to indicate when new buyer profiles should be created.

In the example of FIG. 3, the probabilistic model 300 shows that the triangular node that represents the first buyer profile 128(1) is associated with a square node 302, which represents a first payment card with a 1.0, i.e., 100 percent, confidence score, as indicated at 304. The confidence score 304 indicates that the financial transactions conducted using the first payment card correspond to the first buyer profile 128(1) with a confidence of 100 percent, but, of course, this confidence score may not necessarily authorize a buyer to use the corresponding payment card, as such authorizations are managed separately. Circular nodes 306 and 308 represent respective transactions that were conducted using the first payment card, and are thereby associated with the node 304. Accordingly, the transaction information corresponding to the transactions 306 and 308 can be associated with the first buyer profile 128(1) with a confidence level of 100 percent.

The triangular node that represents the first buyer profile 128(1) is also associated with a square node 306, which represents a second payment card with a 1.0 confidence score. For example, suppose that the first buyer associated a particular email address with the first buyer profile 128(1), such as when signing up for an electronic payment account. Subsequently, suppose that the first buyer used the second payment card for a transaction and requested that a receipt be sent to the same email address as the email address associated with the first buyer profile. Accordingly, based on a matching of the email address associated with the second card and the email address previously associated with the first buyer profile 128(1), the second payment card may be associated with the first buyer profile with a 1.0 confidence score, as indicated at 312. This confidence score 312 indicates that transactions, such as a transaction represented by a circular node 314, conducted using the second payment card may be included in the first buyer profile 128(1) with a confidence level of 100 percent.

In addition, the model 300 shows the triangular node 302 that represents the first buyer profile 128(1) and the second triangular node that represents the second buyer profile 128(2) are both associated with a square node 316, which represents a third payment card. For example, suppose that when the transaction information including the third payment card information was received, an identifier associated with the third payment card did not the match card identifiers in any current buyer profiles. Further, suppose that the name associated with the third payment card (Fred T. Redd) is the same as the names associated with two buyer profiles, i.e., the first buyer profile 128(1) and the second buyer profile 128(2). Accordingly, the third card may be associated with the first buyer profile 128(1) and the second buyer profile 128(2) using a 0.5, or 50 percent, level of confidence as the confidence score, as indicated at 318 and 320, respectively. Consequently, the model 300 indicates that there is a 50 percent probability that a transaction represented by a circular node 322 conducted using the third payment card was performed by the first buyer associated with the first buyer profile 128(1) and a 50 percent probability that the transaction was conducted by the second buyer associated with the second buyer profile 128(2).

Accordingly, in some examples, the transaction information for the transaction represented by node 322 may not be associated with either of the first profile 128(1) or the second profile 128(2), since a name is not always a reliable indicator of an individual identity. However, in other examples, other information included with the transaction information may be taken into consideration to change the confidence levels 318, 320. For instance, the second buyer profile 128(2) may have a fourth payment card associated, as indicated by square node 324, with a confidence score of 1.0, as indicated at 326. Accordingly, a transaction corresponding to circular node 328 may be associated with the second buyer profile 128(2) with 100 percent confidence.

As an example, suppose a comparison of the item purchase information from the transaction associated with node 322 with the item purchase information for the transactions associated with nodes 306, 308, 314 and 328 indicates that the transaction associated with node 322 took place at the same merchant POS location and at the same approximate time of day, but on a different date, as the transaction associated with node 308. Further, suppose that the transaction associated with node 328 and associated with the second buyer profile 128(2) took place in a different city from the transactions associated with nodes 306, 308, 314 and 322. Furthermore, suppose that the transaction associated with node 308 is for a medium-sized vanilla latte and a blueberry bagel, and that the transaction associated with node 322 is for a medium-sized vanilla latte and a cinnamon bagel. Accordingly, in some instances, the transaction information for the respective transactions may be used to substantially change the confidence scores 318 and 320, which, if the confidence score exceeds a threshold, results in the transaction information associated with node 322 being associated with the first buyer profile 128(1).

As one example, probabilistic model 300 may include a trained statistical model that accounts for numerous pieces of information included in the transaction information for various types of transactions, such as location of the transaction, type or category of merchant, time of day of the transaction, day of the week, items purchased through the transaction, descriptors of items purchased, amount paid for the transaction, and so forth, in addition to information such as payment card identifier, name associated with the payment card, and any other information, such as email addresses, home or business addresses, phone numbers, etc. The statistical model may be initially trained using a set of training data, checked for accuracy, and then used for matching transactions with particular buyer profiles by determining confidence scores, and associating a particular transaction with a particular buyer profile when a confidence score exceeds a specified threshold of confidence. The statistical model may be periodically updated and re-trained based on new training data to keep the model up to date. Examples of suitable statistical models that may be incorporated into the one or more probabilistic models 300 herein may include regression models, such as linear regression models, and stochastic models, such as Markov models, hidden Markov models, and so forth.

For example, suppose that, based on analysis of the item purchase information for the transactions associated with nodes 306, 308, 314, 322 and 328, the confidence score 318 is greater than 0.8, while the confidence score 320 is correspondingly less than 0.2. As one example, suppose that the threshold for associating transaction information with a buyer profile is 0.8. Then, if the probabilistic model 300 indicates a confidence score that is greater than 0.8, the transaction information associated with the node 322 may be associated with the first buyer profile 128(1). Thus, the buyer profiles 128 may indicate the item purchase activity and payment activity of an associated buyer across multiple payment accounts or other payment instruments.

Accordingly, the analysis module 218 may be configured to harmonize the transaction information that is received from various merchant devices so that orphan or otherwise disconnected sets of transaction information that correspond to different financial payment instruments, e.g., different payment cards or electronic payment accounts, etc., can be matched to or otherwise associated with particular buyer profiles. In some examples, the analysis module 218 is configured to match financial data corresponding to different financial accounts using the one or more probabilistic models of buyer profiles and respective transactions conducted using the different financial payment instruments. In some examples, the analysis module 218 can apply the probabilistic model 300, for example, by utilizing one or more of a weighted graph model, a probabilistic data store and/or a trained statistical model.

To generate and/or apply the probabilistic model 300, the analysis module 218 may be configured to match, either exactly or heuristically, buyer information and/or item information included in the transaction information using one or more common characteristics. Characteristics that can be used to match transactions include a payment instrument number, e.g., a debit card number or credit card number, Track 1 data from the payment card magnetic strip (e.g., a name of the buyer involved in the transaction), an email address linked to the transaction (e.g., a receipt email address) or the name used by an buyer in an email username string, e.g., "fred.redd@example.com," to name a few examples. However, the techniques described herein can be performed using any type of characteristic that can identify a buyer. Further, some characteristics, such as email address, phone number or payment card identifier, may have a higher level of confidence than other characteristics such as buyer name.

Thus, the probabilistic model 300 may represent associations between buyer profiles, respective financial accounts or other payment instruments, and the transactions associated with those accounts or other payment instruments. After finding a match between a buyer profile and transaction information for a particular transaction, the probabilistic model 300 or the analysis module 218 can assign a confidence score that is associated with that match. For example, some types of matches, such as email addresses, payment card identifiers, telephone numbers, and the like, may have such high confidence levels that a confidence score of 100 percent or 1.0 may be assigned if there are no other matching buyer profiles. For heuristic matches, the confidence score is a probability that represents a likelihood that a particular transaction is associated with a particular buyer profile, rather than a different buyer profile. The analysis module 218 can update these probabilities as transaction information describing new transactions is received from the merchant devices.

The analysis module 218 can use the probabilistic model to create or add to buyer profiles to provide a holistic view of a corresponding buyer's shopping behavior and preferences, as compared to other buyers. For example, for a particular buyer, the analysis module 218 can determine based on the buyer's history of transactions (using, for example, the respective itemized listing of purchases associated with those transactions) that the particular buyer is likely to prefer a vegetarian diet because the buyer orders less meat-based items than other similar buyers. This probabilistic data point can then be added to the particular buyer's buyer profile.

Some types of information can be associated with a buyer profile in a probabilistic manner. For example, the buyer's gender and age may be determined within a certain confidence level based on the buyer's name and third-party data, e.g., data from the U.S. Census Bureau, data from a social network site, data from a microblog site, or other online presences of the various different buyers. The buyer's dietary restrictions or habits can be probabilistically determined from the buyer's itemized listings of purchases. For example, if the buyer always orders soy-based coffee, then a probabilistic data point indicating that this buyer is lactose intolerant may be included in the corresponding buyer profile. Geographic locations corresponding to the buyer's home and/or work locations can be probabilistically determined based on the geographic locations of merchants where the buyer conducts transactions. For instance, the analysis module 218 can determine a likely home or work location based on a geographic location at which a transaction was conducted with a taxi and the corresponding amount charged by the taxi. The analysis module 218 can determine a radius beginning from the drop-off geographic location and based on how far the taxi could travel for the amount that was charged. Similarly, the analysis module 218 can add probabilistic data points referencing the buyer's commutes to certain geographic locations. For example, the analysis module 218 can probabilistically determine the buyer's commutes to certain geographic locations based on purchases made while on a predictable path the buyer follows on certain days and at certain times.

Various hobbies and other activities can also be probabilistically associated with the buyer profile of a particular buyer. For example, the analysis module 218 can evaluate the types of merchants at which the buyer conducts transactions. The categories of these merchants can be determined, for example, using the merchants' self-declared business category or using merchant category codes (MCC). The MCC is a four-digit number assigned to a business by credit card companies (e.g., American Express®, MasterCard®, VISA®) when the business first starts accepting payment cards as a form of payment. The MCC is used to classify the business by the type of goods or services provided by the business. Accordingly, if the buyer is regularly shopping at a particular category of merchant, e.g., a bike shop, then the buyer can be probabilistically identified as a cyclist. For example, if the buyer purchases bike lights from a bike shop and returns to the bike shop the following week to purchase a spare tire, then a probabilistic data point indicating that the buyer is a cyclist might be added to the buyer's buyer profile.

As another example, the buyer's preferences for certain types of clothing, shoes, sizes, and colors can also be determined from the item information associated with the buyer's transactions. For example, if the buyer purchases red medium-sized shirts, then probabilistic data points indicating that the buyer prefers the color red, red shirts, and medium-sized shirts, can be added to the corresponding buyer profile. As described below, buyer profiles for multiple buyers can be aggregated in various ways to provide recommendations and other information to merchants based on buyer characteristics.

Figure 4:
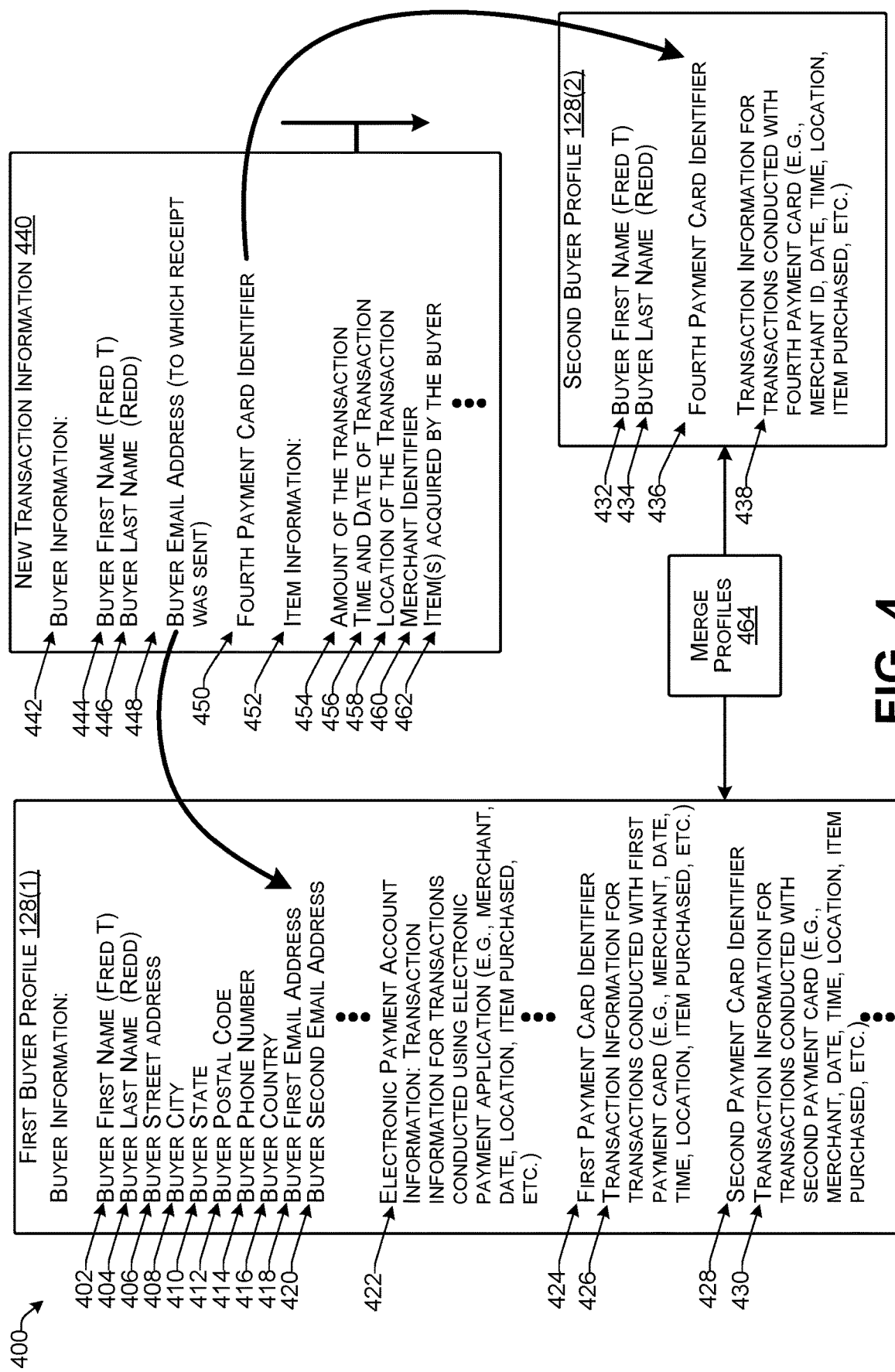
FIG. 4 is a block diagram illustrating an example of merging buyer profiles based on transaction information according to some implementations.

FIG. 4 illustrates an example conceptual diagram 400 of merging buyer profiles based on newly received transaction information according to some implementations. In this example, as discussed above with respect to FIG. 3, the first buyer profile 128(1) and the second buyer profile 128(2) are considered to be separate buyer profiles because the only connection is that the same name (Fred T. Redd) is associated with both buyer profiles, which, taken alone, typically may not provide sufficient confidence for merging two profiles. This example, illustrates a portion of the information that may be included in the first buyer profile 128(1), including buyer first name 402, buyer last name 404, buyer street address 406, buyer city 408, buyer state 410, buyer postal code 412, buyer phone number 414, buyer country 416, buyer first email address 418, buyer second email address 420, and so forth, depending on the information obtain from the buyer and/or obtained over time through transactions conducted by the buyer. The first buyer profile 128(1) may further include electronic payment account information 422, which may include transaction information for transactions conducted using the electronic payment account associated with the first buyer profile 128(1).

In addition, the first buyer profile 128(1) may further include an identifier 424 for a first payment card associated with the first buyer profile 128(1) and transaction information 426 for transactions conducted using the first payment card. As one example, rather than storing an actual credit card number in association with a buyer profile, a one-way hash function may be used to generate a card identifier, or various other encryption techniques may be used to protect the security of the actual card information. Further, individual payment cards may be individually distinguished by the information on the card. For example, a single credit card number may be shared between spouses or other family members, but each card may have additional information to distinguish one card from the other, and thereby distinguish a transaction conducted by a first family member from a transaction conducted by a second family member. In addition, the first buyer profile 128(1) may further include a payment card identifier 428 for a second payment card associated with the first buyer profile 128(1) and transaction information 430 for transactions conducted using the second payment card.

In this example, and as a continuation of the example of FIG. 3 discussed above, the second buyer profile 128(2) includes substantially less information than the first buyer profile 128(2). For instance, the second buyer profile 128(2) merely includes the buyer first name 432, buyer last name 434, a fourth payment card identifier 436, and transaction information 438 for transactions conducted using the fourth payment card.

Suppose that the service computing device has received new transaction information 440, which includes buyer information 442, such as the buyer first name 444, buyer last name 446, a buyer email address 448 to which a receipt was sent, the fourth payment card identifier 450, and item purchase information 452 for the new transaction 440 conducted using the fourth payment card. For example, the item purchase information 452 may include a total amount of the transaction 454, a time and date of the transaction 456, a location 458 of the transaction, such as a geolocation, street address, etc., a merchant identifier 460 of a merchant that participated in the transaction, identification of item(s) 462 acquired by the buyer through the transaction, and may further include various other information related to the transaction (not shown), such as the price paid for each item, any descriptors associated with each item, such as color of the item, size of the item, flavor of item, and so forth.

Furthermore, suppose that the analysis module determines that the email address 448 matches the buyer first email address 418 in the first buyer profile 128(1) and that the fourth payment card identifier 450 matches the fourth payment card identifier 436 associated with the second buyer profile 128(2). Consequently, as an email address and a payment card may typically be considered identifiers of a high level of confidence, then in some examples herein, the second buyer profile 128(2) may be merged with the first buyer profile 128(1), as indicated at 464. For example, to perform the profile merging 464, the information in the second buyer profile 128(2), such as the fourth payment card identifier 436 and the transaction information 438 may be related to or otherwise associated with the first buyer profile 128(1), and the second buyer profile 128(2) may be deleted, marked for deletion, marked inactive, or the like.

Figure 5:
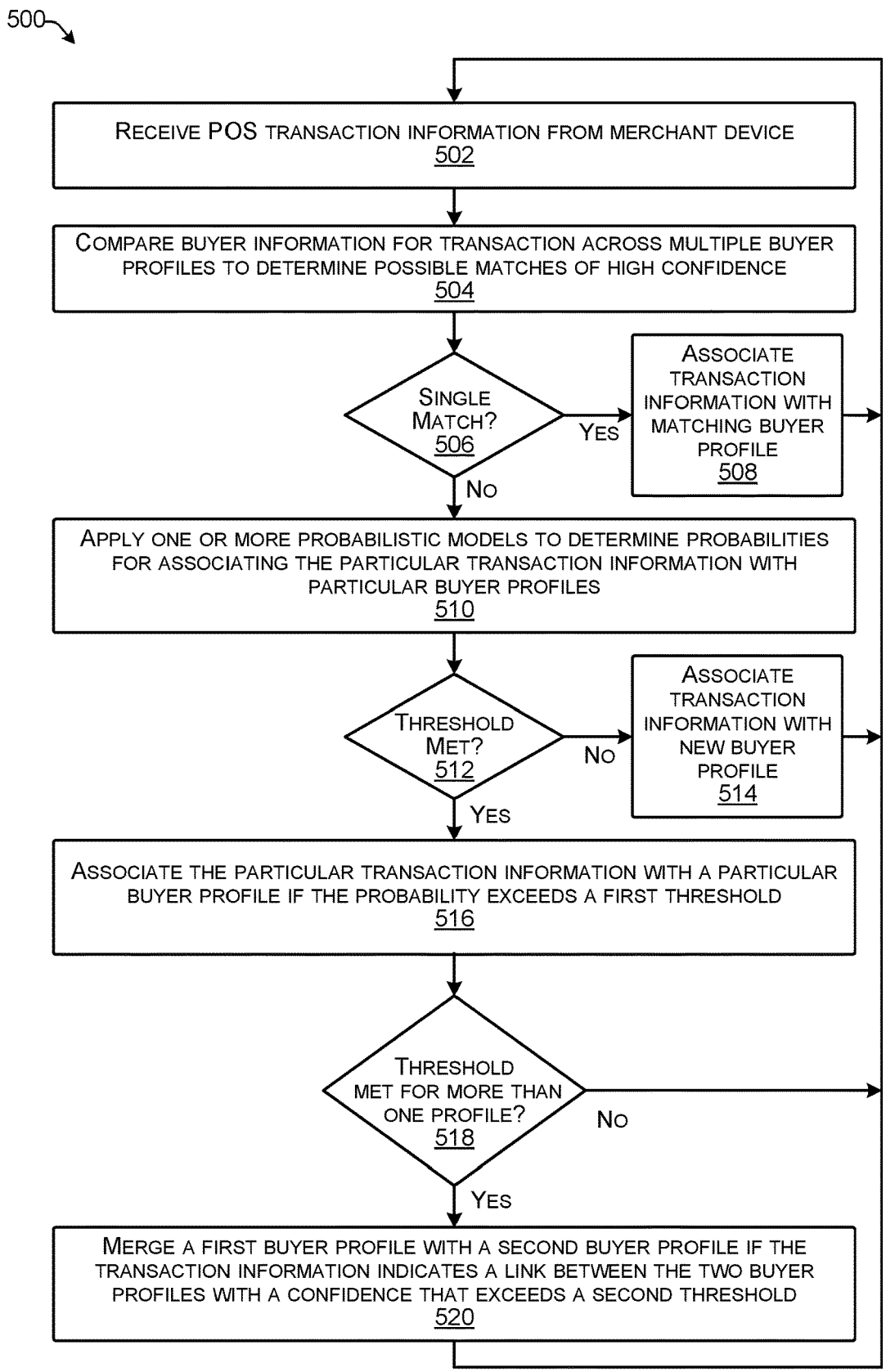
FIG. 5 is a flow diagram illustrating an example process for associating transactions with buyer profiles according to some implementations.

FIG. 5 is a flow diagram 500 illustrating an example process for associating transactions with buyer profiles according to some implementations. The process of FIG. 5 and the processes of FIGS. 8 and 9 below are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems. Accordingly, in some implementations, the example process 500 of FIG. 5 may be executed by one or more processors of the service computing device 102 of the service provider.

At 502, the one or more computing devices may receive POS transaction information from a merchant device associated with a merchant. For example, as discussed above with respect to FIGS. 1 and 2, a plurality of the merchant devices associated with a plurality of different merchants may send transaction information for a plurality of transactions to the service computing device 102. Each instance of transaction information may include various amounts of buyer information and item purchase information, such as discussed above with respect to FIGS. 3 and 4.

At 504, the one or more computing devices may compare the transaction information across multiple buyer profiles to determine possible matches with existing buyer profiles. For example, as discussed above with respect to FIGS. 3 and 4, buyer information from the transaction information may be compared with buyer information associated with existing buyer profiles.

At 506, the one or more computing devices may determine whether there is a match of high confidence with a single buyer profile, such as through matching payment card identifiers, email addresses, telephone numbers, payment account identifiers, a merchant incentive program identifier, or other identifiers of high confidence. For example, the confidence of a match for these types of identifiers may be sufficiently high that additional comparisons may not be required. However, in other examples, additional comparison may be performed as discussed below, such as to guard against the possibility that an incorrect phone number or email address was entered, fraudulent use of payment cards, and so forth.

At 508, when there is a match of high confidence with a single particular buyer profile, the one or more computing devices may relate or otherwise associate the transaction information to the matching buyer profile. For example, in the case of a relational database, the transaction information may be related in the database to the buyer profile. In other types of storage systems, the transaction information may be stored with a buyer profile, or may be otherwise associated with the buyer profile using any suitable techniques.

At 510, when there is not a high confidence match with a particular buyer profile, the one or more computing devices may apply one or more probabilistic models to determine probabilities, such as confidence scores, for relating the particular transaction information with particular buyer profiles. For instance, as discussed above with respect to FIGS. 3 and 4, the one or more probabilistic models may include one or more trained statistical models that take into consideration numerous different aspects of the item purchase information such as time, date, place, merchant, items purchased, information about items purchased, and so forth, as well as the buyer information associated with the transaction, as discussed above.

At 512, the one or more computing devices may determine whether a threshold level of confidence is met for associating the transaction information with any of the existing buyer profiles.

At 514, if the threshold level of confidence is not met for any of the existing buyer profiles, the one or more computing devices may associate the transaction information with a new buyer profile. For example, the buyer information included with the transaction information may be used to generate a new buyer profile and the transaction information may be associated with the new buyer profile.

At 516, if the threshold level of confidence is met for at least one buyer profile, the transaction information may be associated with that buyer profile.

At 518, the one or more computing devices may determine whether a threshold level of confidence is met for more than one profile. For example, as discussed above with respect to FIG. 4, the transaction information may include a first piece of buyer information, such as a payment card identifier, that can associate the transaction information with a high-level confidence to a first buyer profile, and may also include another piece of buyer information such as an email address, phone number, or the like, that can associate the transaction information with a second buyer profile.

At 520, if the transaction information can be associated with multiple buyer profiles with a high-level of confidence that exceeds a second threshold, the first buyer profile and the second buyer profile may be merged together as discussed above with respect to FIG. 4. In some examples, the second threshold level of confidence may be different from the first threshold level of confidence. Further, other information included in the multiple buyer profiles may be examined to determine that there is not a conflict to the decision to merge the multiple buyer profiles. The process may subsequently begin processing the next transaction received from the merchant devices.

Figure 6:
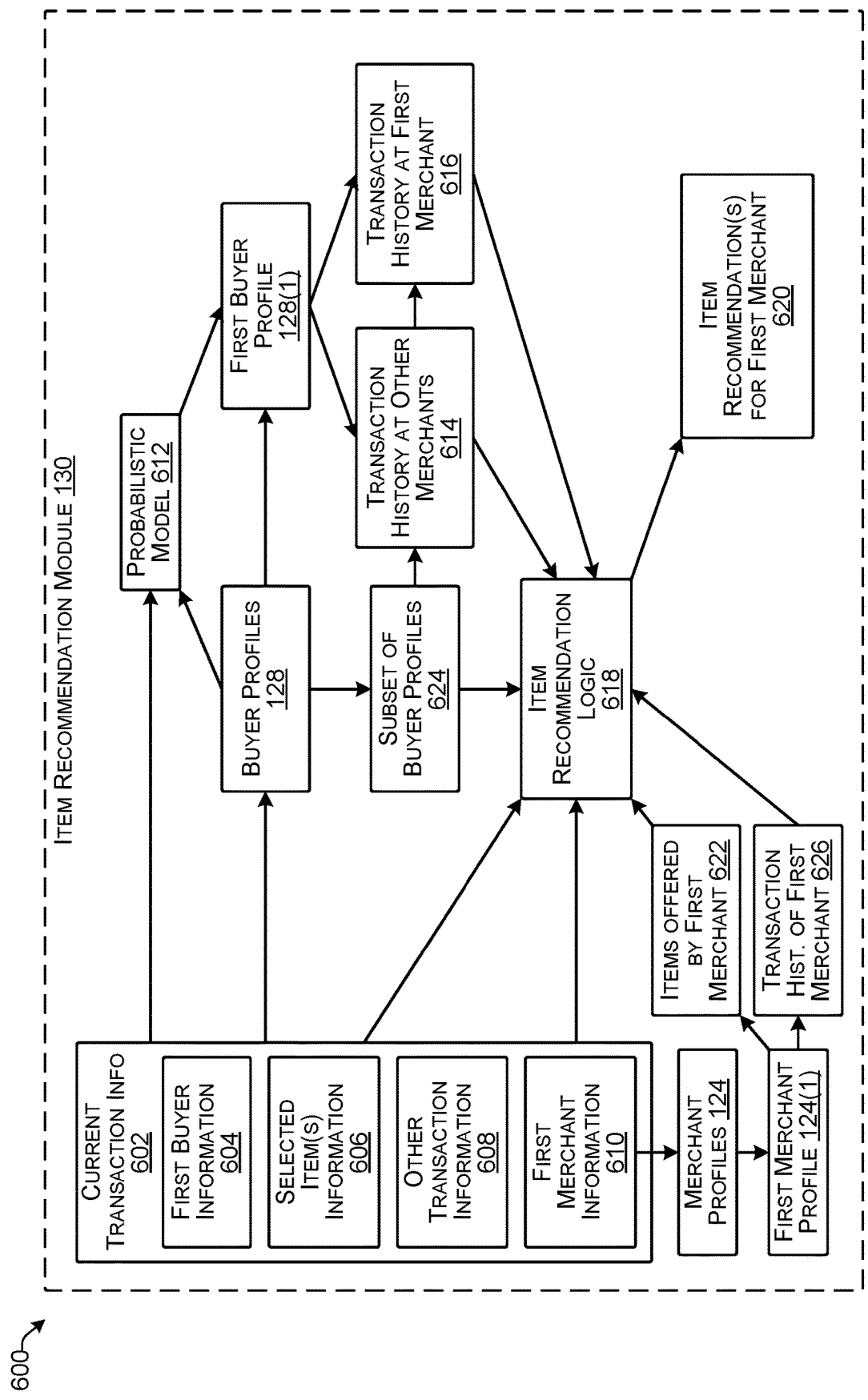
FIG. 6 is a block diagram illustrating an example of determining items to recommend to merchants according to some implementations.

FIG. 6 is a conceptual diagram 600 illustrating an example of determining item recommendations for merchants according to some implementations. As mentioned above, the item recommendation module 130 can determine one or more items to recommend to a merchant as a cross-sell or up-sell opportunity based on received POS transaction information. In the example of FIG. 6, suppose that the item recommendation module 130 receives current transaction information 602 for a transaction currently taking place between a first buyer and a first merchant (not shown in FIG. 6). The item recommendation module 130 generates one or more item recommendations to send to the first merchant based at least in part on the current transaction information 602.

In this example, the current transaction information 602 includes first buyer information 604, item information 606 for one or more items selected by the first buyer, other transaction information 608, and first merchant information 610 about the first merchant. For example, the first buyer information 604 may include buyer identifying information to enable the current transaction information 602 to be matched with an existing buyer profile 128. As mentioned above, examples of buyer identifying information may include a payment card identifier, an electronic payment account (e.g., based on the first buyer's use of the buyer application for conducting the transaction), an email address, a phone number, a merchant club account of which the first buyer is a member, or the like.

Furthermore, the selected item information 606 may be for any item selected by the first buyer, such as for any good or service offered by the first merchant. For example, the first merchant (or an employee thereof) may enter the buyer's selection into the merchant device 104, such as by selecting an icon representative of the item, scanning a barcode associated with the item, or using any of other various techniques. As another alternative, the first buyer may use the buyer application 118 to select one or more items, the buyer application 118 may transmit the selected item information to the service computing device 102, and the selected item information 606 may be provided to the merchant device by the service computing device 102. As still another alternative, the first buyer may use the buyer application 118 to select the item, and the buyer application 118 may communicate directly with the merchant device to provide the selected item information. In addition to including an identification of the selected item, the selected item information 606 may include a price of the selected item, one or more descriptors of the selected item, such as color, size, style, flavor, etc., depending on the type of the selected item, and/or any other available information about the selected item.

The current transaction information 602 may further include the other transaction information 608, such as the time of day, day of the week, and date on which the POS transaction is being conducted, the location at which the POS transaction is being conducted, and/or any other conditions under which the transaction is being conducted that may be conveyed through an electronic communication. Furthermore, the first merchant information 610 may include an identifier of the first merchant, which may be any suitable type of identifier, such as an identifier assigned by the service provider, an identifier selected by or provided by the first merchant when signing up for the payment service, the name of the first merchant, an email address associated with the first merchant, an identifier associated with the merchant device of the first merchant, an identifier associated with an instance of the merchant application executing on the merchant device, a GPS location of the merchant device, or any other suitable identifier that can be used to match the current transaction information 602 with a first merchant profile 124(1) for the first merchant. Accordingly, the first merchant information 610 may be used to determine the first merchant profile 124(1) from the plurality of merchant profiles 124.

Similarly, the first buyer information 604 may be used to determine, from the plurality of buyer profiles 128, a first buyer profile 128(1) that corresponds to the first buyer participating in the current POS transaction. As discussed above, in some cases, the first buyer information 604 may be incomplete in that it is not possible to determine with 100% confidence a particular buyer profile 128 corresponding to the first buyer. In such a situation, a probabilistic model 612 may be applied as discussed above with respect to FIGS. 3-5 for determining a buyer profile with which to associate the current transaction information 602. For example, if the first buyer information 604 indicates an association with multiple buyer profiles 128, the probabilistic model 612 may be used to associate the current transaction information 602 with a particular one of the buyer profiles 128 with a level of confidence that exceeds a threshold level of confidence.

In either event, when a first buyer profile 128(1) has been determined to correspond to the first buyer participating in the current transaction, the item recommendation module 130 may access at least one of the transaction history 614 at other merchants included in the buyer profile 128(1), or the transaction history 616 at the first merchant included in the buyer profile 128(1). The transaction history information 614 and/or 616 may be provided to, or accessed by, item recommendation logic 618 that may use this information along with other information when determining an item recommendation 620 for the first merchant. For example, the item recommendation logic 618 may be one or more algorithms, computational models, or the like, configured to determine particular items to recommend for cross-selling, up-selling, or bundling for generating the one or more recommendations 620.

As one example, the item recommendation logic may determine the selected item from the selected item information 606 and may compare the selected item with the transaction history at the first merchant 616 and/or the transaction history other merchant 614 to determine which other items have been most frequently purchased with the selected item in past transactions. The item recommendation logic 618 may also access the items 622 offered by the first merchant, when determining which items to recommend to the first merchant. For example, the first merchant may provide a menu or other listing of items offered by the merchant when signing up for the payment service, or may otherwise provide a list of items in the first merchant's inventory, etc., to the service provider computing device 102. Further, it is typically more useful to recommend that the first merchant offer an item that is currently available from the first merchant when providing cross-sell or up-sell recommendations to the first merchant, and therefore, the item recommendations may be limited to the items offered by the first merchant. However, in some cases, the item recommendation module 130 may determine that one or more items not available from the first merchant are often purchased in the same transaction with the item currently selected by the first buyer. In such a situation, the item recommendation module 130 may send, e.g., at a later time, a communication to the first merchant recommending that the first merchant consider stocking or otherwise offering the particular recommended item not currently offered, which may thereby increase the overall profitability of the first merchant.

As another example, the item recommendation module 130 may determine a subset 624 of buyer profiles from the plurality of buyer profiles 128, based on at least one of similarity of characteristics with the first buyer profile 128(1), and/or based on other characteristics, such as having previously purchased the selected item from other merchants, and/or having previously purchased the selected item from the first merchant. For example, suppose the first buyer has never purchased the selected item before, or has never purchased another item with the selected item. Consequently, the item recommendation logic 618 may check to see what buyers similar to the first buyer most frequently purchase with the selected item. Thus, as one example, the item recommendation module 130 may search the buyer profiles 128, including the respective transaction histories 614 at other merchants or the respective transaction histories 616 at the first merchant to determine a subset of buyer profiles in which the transaction histories show a purchase of the selected item and one or more other items in the same transaction at either the first merchant or at another merchant. For example, the item recommendation logic 618 may determine a subset of buyer profiles 624 that are similar to first buyer profile based on one or more shared characteristics, and may determine the item to recommend based at least in part on a frequency of the item being purchased with the first item among the buyer profiles in the subset 624. In other words, the recommendation module 130 determines what item other buyers similar to the current first buyer have purchased most frequently with the selected item, and recommends that item to the merchant.

In some examples, the transaction histories 614 for transactions at other merchants may be further filtered or limited to merchants categorized in the same category as the first merchant or otherwise similar to the first merchant. The item recommendation module 130 may access the first merchant profile 124(1) to determine information relevant to the first merchant, such as a merchant category, merchant location information, or various other types of merchant information, such as items offered for sale, hours of operation, and so forth. For instance, the MCC for a merchant or other classification techniques may be used to categorize similar types of merchants into merchant categories. In some examples, the merchant categories used herein do not match the MCC categories, but may be more inclusive or less inclusive categories. Similarly, the merchants (and buyers) may be classified into location categories, such as for particular categories of geographic regions, e.g., same street, same neighborhood, same postal code, same district of a city, same city, and so forth. Alternatively, of course, other location-based techniques may be used for determining merchants and/or buyers in the same geographic region or within proximity to one another, etc., such as radial distance from a reference location, or the like.

Furthermore, as mentioned above, the subset of buyer profiles 624 may be filtered or otherwise limited based on similarity of characteristics with the first buyer profile 128(1). These characteristics may include buyer characteristics and/or item purchase characteristics. For example, the first buyer profile 128(1) may include information about the first buyer, such as: buyer residence information; buyer age; buyer sex; buyer affluence; buyer ethnicity; buyer language; buyer education; buyer marital status; buyer occupation; buyer religion; buyer political affiliation; buyer memberships in associations, and so forth. For instance, the item recommendation module 130 may determine that 34% of buyers in the same age range and level of affluence purchased item B with item A from the first merchant, whereas only 10% of buyers overall may have purchased item B when purchasing item A.

As one example, subsets can be determined using generally known clustering techniques to group a plurality of buyer profiles in such a way that buyer profiles that share certain characteristics are more similar to each other than other buyer profiles. For example, the item recommendation module 130 can create subsets of buyer profiles based on various behavioral characteristics or demographic characteristics including, for example, geographic locations where the buyers shop, the categories of merchants at which the respective buyers shop, the items purchased by the buyers, the time of day the buyers shop, the average amount spent by the buyers in certain merchant categories, and so forth.

The item recommendation logic 618 may further take into consideration other transaction information 608, such as time of day and days of the week during which items were acquired in the same transaction. For example, if the current transaction is taking place at 3:00 pm, the item recommendation 620 may be different from if the current transaction is taking place at 7:00 am in the morning. For instance, more buyers may tend to purchase a bagel with a cup of coffee in the morning, and more buyers may purchase a cookie with the cup of coffee in the afternoon. The item recommendation logic 618 may further take into consideration other item information, such as descriptors related to the items acquired, prices paid for the items acquired, and so forth.

Furthermore, the first buyer profile 128(1) may provide an indication as to whether the first buyer is receptive to incentive offers, such as being more willing to purchase additional items if offered at a discount or as part of a bundle, such as based on whether the first buyer has accepted such deals in the past. As one example, if such is the case, the item recommendation module 130 may recommend that the first merchant offer the second item with the selected item as a bundle at a discount to the first buyer. For instance, the item recommendation module 130 may send a recommendation to the first merchant that identifies a second item to offer with the selected item, and may further recommend that the first merchant offer the second item with the first item as a bundle at e.g., a 5% discount on the overall combined price for the two items, if purchased together during the transaction.

As another example, suppose that the first buyer information 604 is insufficient to identify a buyer profile 128 to associate with the current transaction information 602. Accordingly, the item recommendation logic 618 may access a transaction history of the first merchant 626 to determine one or more items that have sold well in the past with the selected item selected by the first buyer for the current transaction. For example, suppose that the first buyer is paying cash for the selected item, and has provided no additional buyer information 604. Accordingly, the item recommendation logic 618 may access a transaction history of the first merchant and/or other merchants classified in the same category as a first merchant to determine one or more other items that are commonly sold with the first item selected by the first buyer. Therefore, the item recommendation logic 618 may select one or more of these items as recommended items to include in the item recommendations 620 for the first merchant. Consequently, while the recommendations are not targeted to the particular first buyer for the current transaction, the recommendations may still be based on those items preferred by the largest percentage of other buyers who frequent the first merchant and/or other merchants similar to the first merchant, thereby maximizing the likelihood of the up-sell or cross-sell offer being accepted.

Furthermore, in addition to, or as an alternative to, using the merchant profiles to obtain this information, the item recommendation logic 618 may use the buyer profiles 128 to determine similar information. For example, the item recommendation logic 618 may search for transactions in the buyer profiles 128 for the first item selected by the first buyer, and may determine additional items purchased with the selected item in the same transaction. The item recommendation logic 618 may then determine which items are purchased most frequently with the selected item. The item recommendation logic 618 may further apply additional filters, such as limiting the results to those merchants that are similar to the first merchant, limiting the results to transactions taking place at approximately the same time of day, on the same day of the week, or the like.

In addition, in some examples the item recommendation module 130 may provide the item recommendations 620 to the first merchant in advance of a transaction. For example, as discussed above, the item recommendation module may determine item recommendations for particular items 622 offered by the first merchant. Accordingly, the item recommendation module 130 may make these recommendations in advance as predetermined recommendations, and the merchant application 110 on the merchant device 104 may download these predetermined recommendations to the merchant device 104 for a particular merchant. For example, the predetermined recommendations might not be targeted to any particular buyer, but instead may reflect which items offered by the particular merchant are most frequently sold with which other items also offered by the particular merchant. As another example, the predetermined recommendations may be filtered based on characteristics of buyers that most frequently purchase items from the particular merchant, to thereby provide predetermined item recommendations that are somewhat targeted towards buyers most likely to be purchasing items from the particular merchant. The predetermined item recommendations may be further filtered based on time of day, day of the week, overall transaction amount and numerous other characteristics of transactions that have been conducted with the least one of the first merchant or with other merchants that are similar to the first merchant.

As mentioned above, the predetermined item recommendations may be stored on a local memory of the merchant device such as in the case that the merchant device is operated in an offline mode, such as by being operated out of contact with a network, or the like, or being otherwise unable to communicate with the service computing device 102. As another example, the predetermined item recommendations may be stored in the cloud or at the remote storage location that is accessible by the particular merchant device 104. Furthermore, the item recommendation module 130 may periodically send updated predetermined recommendations to the particular merchant such as when the particular merchant changes the items 622 offered by the particular merchant, or when the predetermined recommendations otherwise change due to changes in buyer purchase habits or the like. In addition, the merchant may be able to access the predetermined recommendations such as through a dashboard module of the merchant application, or the like, to determine items that the merchant may wish to offer as a bundle so that the pricing of such bundles can be determined by the merchant in advance.

Figure 7:
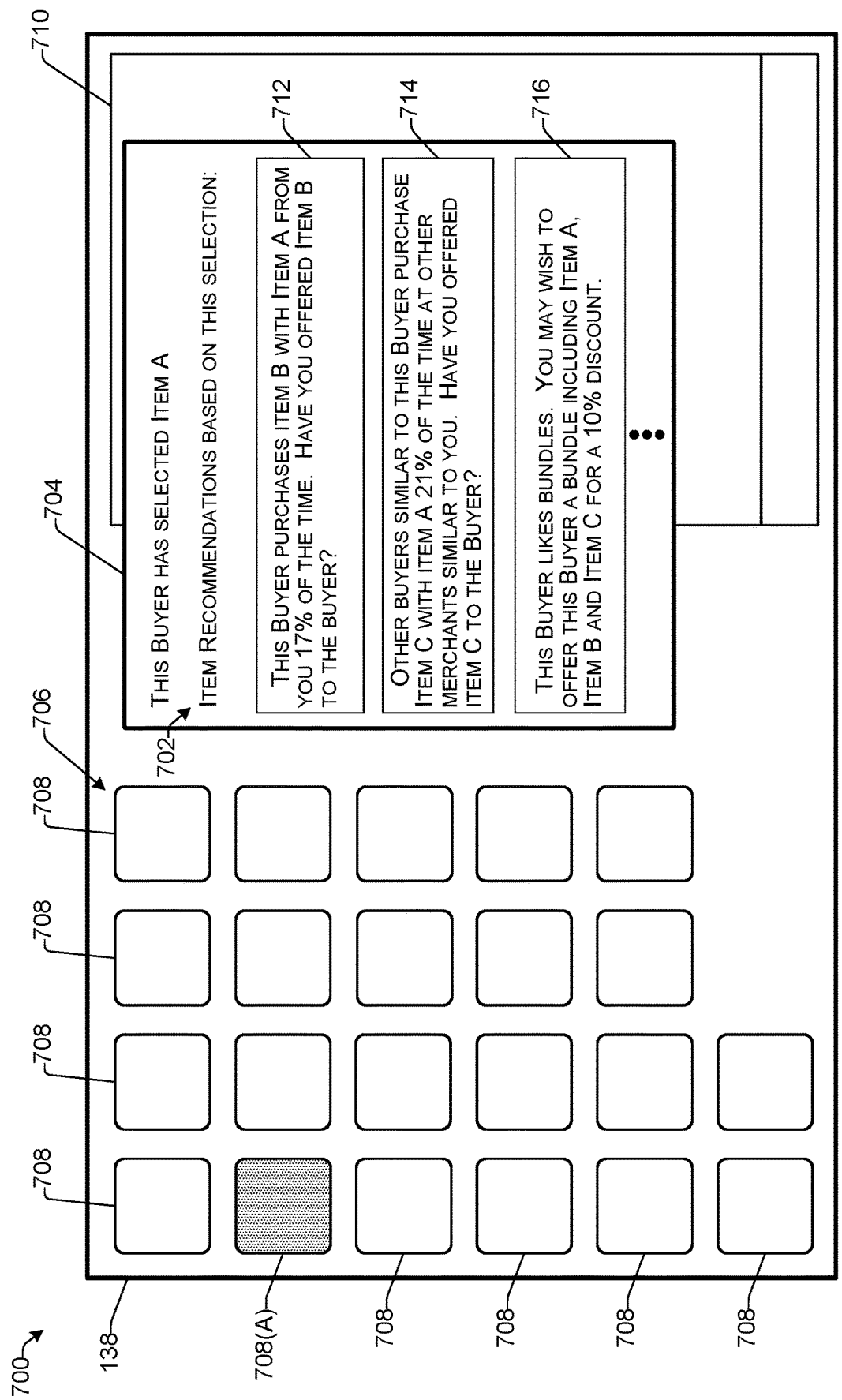
FIG. 7 illustrates an example interface for presenting item recommendations to a merchant according to some implementations.

FIG. 7 illustrates an example graphical user interface 700 for presenting item recommendations to a merchant according to some implementations. For example, one or more item recommendations 702 may be presented in a window 704 or other area of the display 138 associated with the merchant device 104 (not shown in FIG. 7). Alternatively, of course, the item recommendations 702 may be presented to the merchant using any other suitable communication technology or presentation techniques, such as audio presentation, presentation at a designated area of the UI 700, presentation on a separate display, and so forth.

In the example of FIG. 7, the recommendations 702 are shown as being presented in a window 704, such as a popup window, that may be closed by the merchant after viewing, or which may close automatically after the elapse of a predetermined period of time. Additionally, in other examples, the recommendations 702 may be presented in any other suitable type of window, or using any suitable type of graphic, overlaid text, or the like. For instance, the window 704 may be presented as an overlay on a payment interface 706 that is used by the merchant for processing payments from buyers at a POS location. In the illustrated example, the payment interface 706 includes a plurality of icons 708, each of which may represent a separate item that is offered by the merchant, and a selected items/pricing column 710, which may show the item(s) selected and a corresponding current transaction total. In some examples, the payment interface 706 may be optimized to receive touch inputs from a user.

In the illustrated example, suppose that icon 708(A) has been selected, and is highlighted to indicate the selection of item A (not shown in FIG. 7), based on the buyer's selection of item A. Furthermore, suppose that the buyer has provided a payment card, which the merchant has swiped, or that the buyer is using a payment account through the buyer application, or that the buyer has otherwise provided buyer identifying information to the merchant. Item selection information and the buyer identifying information may be sent to the service provider and, in response, the service provider may send back the one or more item recommendations 702, which may be presented in the window 704.

As an example, a first recommendation 712 may indicate that the current buyer purchases item B with item A from the current merchant 17% of the time that the buyer purchases item A from the current merchant. Accordingly, recommendation 712 may recommend that the current merchant offer item A to the current buyer. As another example, a second recommendation 714 may indicate that other buyers similar to the current buyer purchase item C with item A 21% of the time at other merchants similar to the current merchant. For example, the other merchants may be classified in a same category as the current merchant, may be in a similar geographic region category, etc., as discussed above. Furthermore, the current buyer may be classified in a same category as a subset of other buyers that share particular characteristics with the current buyer. Consequently, the recommendation 714 may recommend that the merchant offer item C to the current buyer as well.

As another example, the third recommendation 716 may indicate, from a check of the transaction history for the current buyer, that the current buyer has purchased bundles recommended to the current buyer in the past. Accordingly, the third recommendation 716 may recommend that the current merchant offer a bundle to the current buyer that includes both item B and item C with item A for a 10% discount off the total price of items A, B and C. Further, numerous other types of recommendations may be provided to a merchant with the foregoing going being merely several examples for discussion.

Furthermore, the recommendations may be indicated to the merchant in any suitable manner using any suitable interfaces, with the foregoing being merely several examples provided for descriptive purposes, and thus, recommendations herein are not limited to text-based recommendations. For instance, one of the icons 708 corresponding to a recommended item maybe highlighted or otherwise visually distinguished in the payment interface 706 to indicate to the merchant that the corresponding item is recommended with the selected item, in addition to, or as an alternative to the text-based recommendations. Further, highlighting the icon corresponding to a recommended item may assist the merchant in selecting the icon from the purchase interface 706 if the buyer agrees to add the recommended item to the transaction. As another example, if a bundle is recommended, a new bundle icon (not shown) may be added to the payment interface 706 and presented temporarily (or permanently) in the payment interface 706, along with the discounted price of the bundle, to assist the merchant in quickly recommending the bundle and adding the bundle to the transaction if the buyer agrees. Numerous other variations will be apparent to those of skill in the art having the benefit of the disclosure herein.

Figure 8:
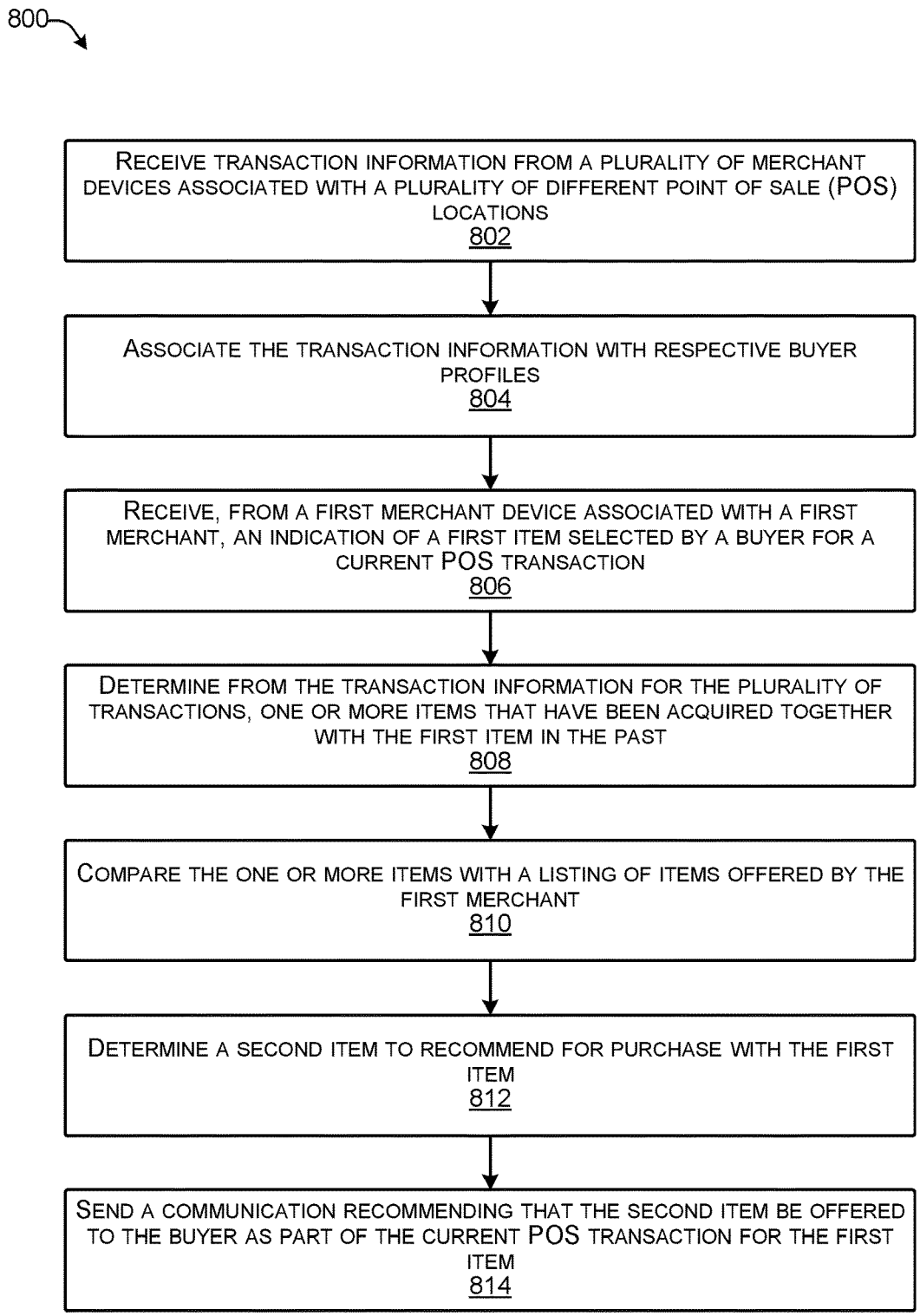
FIG. 8 is a flow diagram illustrating an example process for providing item recommendations to merchants according to some implementations.

FIG. 8 is a flow diagram illustrating an example process 800 for providing recommendations to merchants according to some implementations. In some examples, the process may be executed by the service computing device 102, or by other suitable computing devices.

At 802, the computing device receives transaction information from a plurality of merchant devices associated with a plurality of different POS locations. For example, as discussed above, the service provider computing device may receive transaction information from a plurality of different merchant devices associated with a plurality of different merchants for POS transactions conducted between a plurality of buyers and the plurality of merchants.

At 804, the computing device may associate the transaction information with respective buyer profiles. For example, as discussed above with respect to FIGS. 3-5, a probabilistic model or other suitable techniques may be used for associating the transaction information with respective buyer profiles.

At 806, the computing device may receive, from a first merchant device associated with a first merchant, an indication of a first item selected by a buyer for a current POS transaction. For example, the indication of the first item may be received from the merchant device being used to conduct a current transaction, and may further include buyer information about the buyer, when available.

At 808, the computing device may determine, from the transaction information for the plurality of transactions, one or more items that have been acquired together with the first item in the past. For example, the computing device may access buyer profiles and/or merchant profiles for determining which items the current buyer is likely to purchase with the currently selected item.

At 810, the computing device may compare the one or more items with a listing of items offered by the first merchant. For example, the first merchant may provide the service provider computing device with a menu, inventory, or other type of listing of items offered by the first merchant such as when the first merchant signs up for the payment service and/or when the items offered by the first merchant changes. Additionally, in some examples, the first merchant may provide a list of one or more items that the first merchant would like to sell off quickly, such as stale inventory, or the like.

At 812, the computing device may determine a second item to recommend for inclusion with the first item in the current transaction. For example, the second item may be an item that is offered by the first merchant, as determined based on the list of items offered by the first merchant, and may be an item that the current buyer has purchased with the first item in the past more frequently than any other items purchased with the first item. As another example, if the current transaction cannot be associated with a buyer profile, then more general transaction information may be relied on, such as items that the particular merchant has most frequently sold with the first item, or items that other merchants, similar to the particular merchant, have sold most frequently with the first item. As still another example, if the current transaction can be associated with a buyer profile, but the particular buyer has never bought the first item, or has never bought a second item with the first item, then buyer profiles of buyers similar to the first buyer may be relied on for determining a second item that is most frequently purchased with the first item by the buyers that are similar to the first buyer. For example, plurality of buyer characteristics may be used for determining a subset of buyer profiles that are similar to the buyer profile of the current buyer. Numerous other variations will be apparent to those of skill in the art having the benefit of the disclosure herein.

At 814, the computing device may send a communication to the merchant device of the particular merchant based at least in part on the current transaction information. For example, the communication may be sent to the first merchant device, prior to completion of the current POS transaction, and the communication may identify the second item as a candidate item for inclusion in the current POS transaction. The merchant device may present a recommendation included with the communication on a display of the merchant device, and the merchant may determine whether not to offer the second item to the current buyer based on the recommendation. Furthermore, in some examples, the recommendation may include a bundle recommendation for bundling one or more items with the first item at a reduced price.

Figure 9:
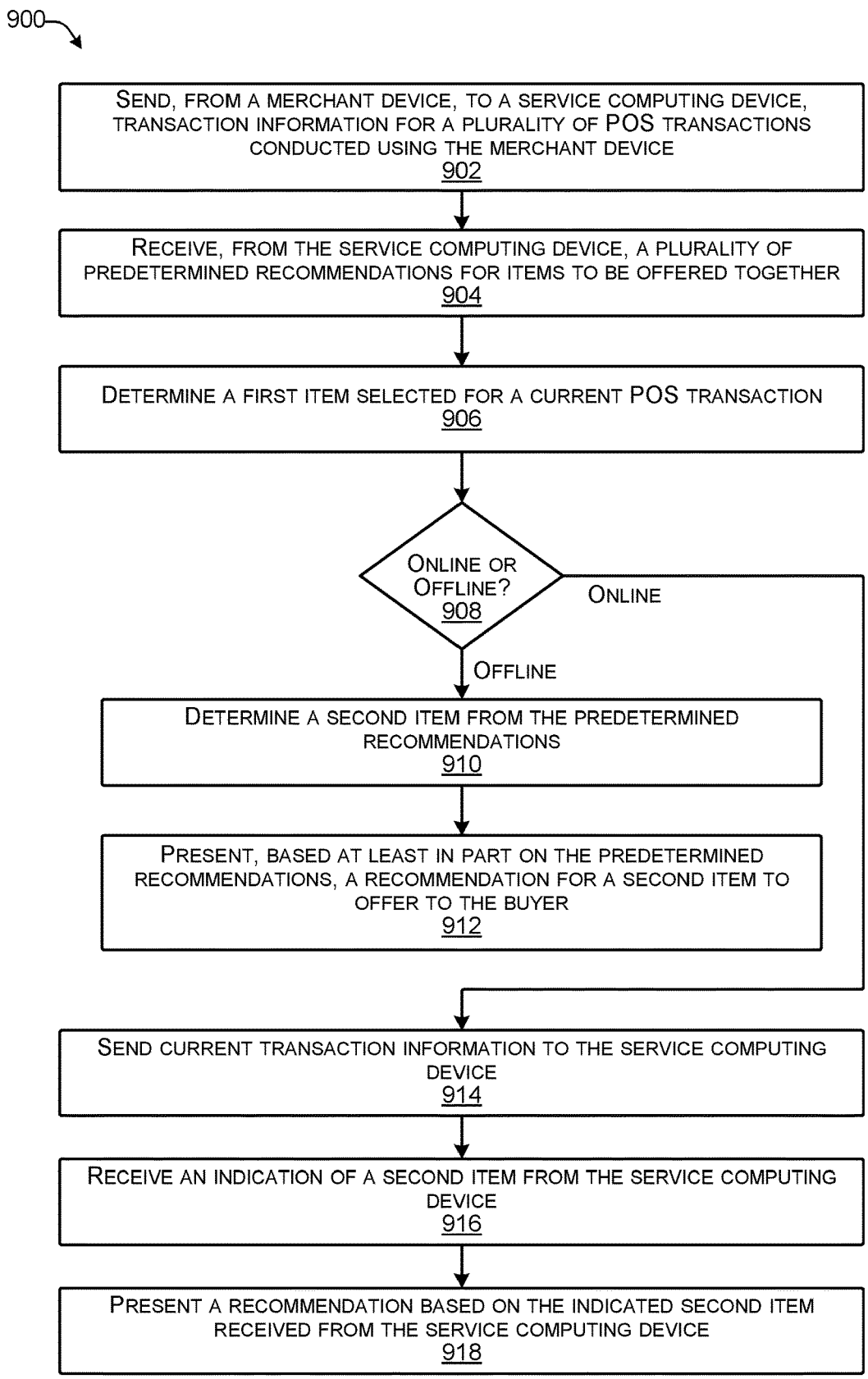
FIG. 9 is a flow diagram illustrating an example process for providing item recommendations to merchants according to some implementations.

FIG. 9 is a flow diagram illustrating an example process 900 for providing recommendations to merchants according to some implementations. In some examples, the process may be executed by the merchant device or by another suitable computing device.

At 902, the merchant device may send, from the merchant device, to a service computing device, transaction information for a plurality of point of sale (POS) transactions conducted using the merchant device. For example, for each individual transaction conducted on the merchant device, the merchant device may send the transaction information for the transaction to the service computing device. As mentioned above, the transaction information may include item information and, when available, buyer information.

At 904, the merchant device may receive, from the service computing device, a plurality of predetermined recommendations for items to be offered together. For example, for a list of items offered by the merchant, the service computing device may determine which items are frequently sold together, e.g. with a frequency greater than a threshold frequency, and may provide a plurality of predetermined recommendations for these items to the merchant device. As mentioned above, the merchant device may store these predetermined recommendations in a local storage or the like.

At 906, the merchant device may determine, for a current POS transaction, a first item selected for the current POS transaction. For example, subsequent to receiving the predetermined recommendations, the merchant device may be used to conduct a current point of sale transactions with a current buyer.

At 908, the merchant device may determine whether the merchant device is currently operating in an online or offline mode. For instance, in some situations, the merchant device may operate in an offline mode in which the merchant device is not connected to the Internet or other wide area network of the one or more networks 106. Thus, the merchant device can be used to complete transactions with buyers while in the offline mode and then may subsequently send the information about the completed transactions to the service computing device when reconnected to a suitable network for communication with the service computing device.

At 910, when the merchant device is in the offline mode, the merchant device may determine, based on a first item selected by the current buyer, a second item from the predetermined recommendations to recommend as a candidate for inclusion in the current transaction. For instance, the merchant device may access the predetermined recommendations and determine which other items offered by the merchant are recommended to be offered with the first item selected by the current buyer.

At 912, the merchant device may present on a display associated with the merchant device, a recommendation for a second item to be offered to the buyer based on the buyer selection of the first item. Accordingly, the merchant device may recommend one or more items to be offered to the buyer based on the predetermined recommendations previously received from the service computing device.

At 914, alternatively, when the merchant device is in the online mode, i.e., is able to communicate with the service computing device, the merchant device may send the current transaction information to the service computing device.

At 916, the merchant device may receive an indication of a second item from the service computing device based at least in part on the current transaction information sent to the service computing device. For example, the merchant device may receive one or more recommendations from the service computing device of one or more items that may be offered to the current buyer based on the current buyer selection of the first item.

At 918, the merchant device may present on a display associated with the merchant device, one or more recommendations based on the indicated second item received from the service computing device. In some examples, the recommendations may be text-based recommendations presented on the display, such as overlaid on a payment processing user interface, as discussed above, or using any other suitable techniques for conveying the recommendation information to the merchant.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Figure 10:
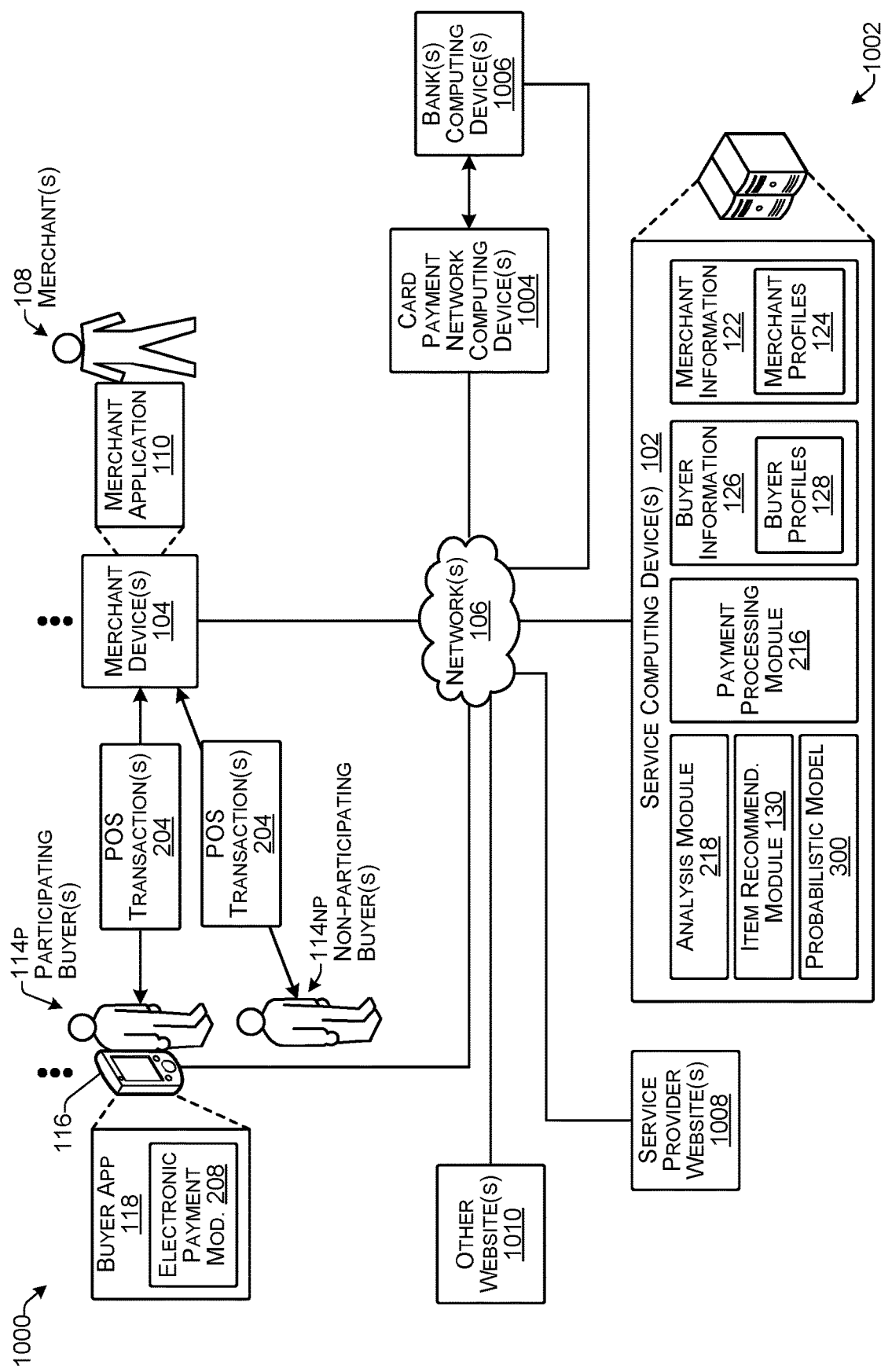
FIG. 10 illustrates an example architecture of a payment and item recommendation system for providing a payment and item recommendation service according to some implementations.

FIG. 10 illustrates an example architecture of a payment and item recommendation system 1000 able to provide a payment and item recommendation service according to some implementations. In the example of FIG. 10, the service computing device 102 of a service provider 1002 includes the payment processing module 216, which may be executed to provide the payment and transaction functionality, as described herein. The payment processing module 216 and corresponding payment functionality may be implemented as one or more computer programs, or other executable instructions, on the service computing device 102 in one or more locations, such as for providing the payment systems, components, and techniques described herein.

The example of FIG. 10 illustrates at least one buyer device 116 and at least one merchant device 104. For example, each buyer device 116 may be associated with a participating buyer 114$p$ that participates in the payment system of the service provider 1002. The buyer device 116 may include the buyer application 118, as previously discussed herein, which may include an electronic payment module 208 that provides functionality for enabling the buyer 114$p$ to make electronic payments using the buyer device 116. In some examples, the buyer application 118 may include various other applications or modules, such as for a buyer dashboard to enable the buyer to control information in the buyer's profile, set buyer preferences, and so forth. Further, the merchant device 104 may be associated with a merchant 108 that participates in the payment service provided by the service provider 1002, and the merchant device 104 may include the merchant application 110. As discussed elsewhere herein, the buyer device 116 and the merchant device 104 can each be a computing device able to communicate with each other, with the service computing device 102, and with various other computing devices, through any suitable communication protocols, interfaces, and networks, including the one or more communication networks 106.

The buyer device 116 and the merchant device 104 can each include one or more components, e.g., software or hardware, that are configured to respectively determine a geographic location of the buyer device 116 and/or the merchant device 104, using, for example, various geolocation techniques, e.g., a global positioning system (GPS), cell tower location, wireless access point location, wireless beacon location, and so forth. Further, the buyer device 116 and the merchant device 104 can each be any appropriate device operable to send and receive requests, messages, or other types of information over the one or more networks 106 or directly to each other. Some examples of buyer devices 116 and merchant devices 104 are enumerated below. Additionally, while only a single buyer device 116 and a single merchant device 104 are illustrated in the example of FIG. 10, in some implementation, there may be thousands, hundreds of thousands, or more, of the buyer devices 116 and the merchant devices 104, depending on the number of the participating buyers 114$p$ and the number of merchants 108.

The one or more networks 106 can include any appropriate network, including a wide area network, such as the Internet; a local area network, such an intranet; a wireless network, such as a cellular network, a local wireless network, such as Wi-Fi and/or close-range wireless communications, such as Bluetooth® and Bluetooth® low energy; a wired network; or any other such network, or any combination thereof. Accordingly, the one or more networks 106 may include both wired and/or wireless communication technologies, including Bluetooth®, Bluetooth® low energy, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail. Accordingly, the service computing device 102, the merchant devices 104, the buyer devices 116, and the other computing devices discussed herein are able to communicate over the one or more networks 106 using wired or wireless connections, and combinations thereof.

Additionally, in some examples, information may also be obtained with respect to non-participating buyers 114$np$ that do not have an account with the payment service provided through the service computing device 102. The transaction information collected with respect to these buyers may be sent to the service computing device 102, and buyer profiles may be created for the nonparticipating buyers 114$np$, as discussed above. Should one or more of the non-participating buyers later become a participating buyer, such as by signing up for the electronic payment service, the transaction information of an existing buyer profile for that buyer may be merged with the newly created profile using the information matching and probabilistic modeling techniques described above with respect to FIGS. 3-5. In addition, in some examples, transaction information may be obtained with respect to non-participating merchants (not shown) that do not use a merchant device 104, and this transaction information may be employed when determining item recommendations for the merchants 108.

When paying for a transaction, the buyer 114 can provide the amount of payment that is due to the merchant 108 using cash, check, a payment card, or by electronic payment using the buyer application 118 on the buyer device 116. The merchant 108 can interact with the merchant device 104 to process the transaction. During POS transactions 204, the merchant device 104 can determine and send data describing the transactions, including, for example, the item(s) being purchased, the amount of the item(s), buyer information, and so forth. In some implementations, the payment and merchant recommendation service enables card-less payments, i.e., electronic payments, for transactions between the participating buyers 114$p$ and the merchants 108 based on interaction of the buyer 114$p$ with the buyer application 118 and interaction of the merchant 108 with the merchant application 110. Accordingly, in some examples, a card-less payment transaction may include a transaction conducted between a participating buyer 114$p$ and a merchant 108 at a POS location during which an electronic payment account of the buyer 114$p$ is charged without the buyer 114$p$ having to physically present a payment card to the merchant 108 at the POS location. Consequently, the merchant 108 need not receive any details about the financial account of the buyer 114$p$ for the transaction to be processed. As one example, the electronic payment may be charged to a credit card issuer or credit card number that the participating buyer 114$p$ provided when signing up with the service provider for the electronic payment account. As another example, the buyer 114$p$ may have a quantity of money pre-paid in an account maintained for use in making the electronic payments. Other variations will also be apparent to those of skill in the art having the benefit of the disclosure herein.

Before conducting an electronic payment transaction, the participating buyer 114$p$ typically creates a user account with service provider of the payment and item recommendation service. The participating buyer 114$p$ can create the user account, for example, by interacting with the buyer application 118 that is configured to perform electronic payment transactions and that may execute on the buyer device 116. When creating a buyer electronic payment account with the payment service, the participating buyer 114$p$ may provide an image including the face of the buyer, data describing a financial account of the buyer 114$p$, e.g., a credit card number, expiration date, and a billing address. This user information can be securely stored by the payment service, for example, in the buyer information 126, such as in a secure database. Further, the buyer profiles 128 may be created for each buyer 114, which may include information about the buyer and transactions conducted by the buyer.

To accept electronic payments for POS transactions, the merchant 108 typically creates a merchant account with the payment and item recommendation service by providing information describing the merchant including, for example, a merchant name, contact information, e.g., telephone numbers, the merchant's geographic location address, and one or more financial accounts to which funds collected from buyers will be deposited. This merchant information can be securely stored by the payment service, for example, in the merchant information 122, such as in a secure database. Further, a merchant profile 124 may be created for each merchant, which may include information about the merchant and transactions conducted by the merchant.

The payment service is configured to enable electronic payments for transactions. The payment service can include one or more servers that are configured to perform securely electronic financial transactions, e.g., electronic payments for transactions between a buyer and a merchant, for example, through data communicated between the buyer device 116 and the merchant device 104. Generally, when a buyer and a merchant enter into an electronic payment transaction, the transaction is processed by electronically transferring funds from a financial account associated with the user account to a financial account associated with the merchant account.

The payment and item recommendation service is configured to send and receive data to and from the buyer device 116 and the merchant device 104. For example, the payment and item recommendation service can be configured to send information describing merchants to the buyer application 118 on the buyer device 116 using, for example, the information stored in the merchant information 122. For example, the payment and item recommendation service can communicate data describing merchants 108 that are within a threshold geographic distance from a geographic location of the buyer device 116. The data describing the merchants 108 can include, for example, a merchant name, geographic location, contact information, and an electronic catalogue, e.g., a menu that describes items that are available for purchase from the merchant.

In some embodiments, the payment and item recommendation system 1000 is configured to determine whether a geographic location of the buyer device 116 is within a threshold geographic distance from a geographic location of the merchant device 104. The payment and item recommendation system 1000 can determine a geographic location of the buyer device 116 using, for example, geolocation data provided by the buyer device 116. Similarly, the payment and item recommendation system 1000 can determine a geographic location of the merchant device 104 using, for example, geolocation data provided by the merchant device 104 or using a geographic address, e.g., street address, provided by the merchant. Depending on the implementation, the threshold geographic distance can be specified by the payment and item recommendation system 1000, by the buyer, or by the merchant.

Determining whether the buyer device 116 is within a threshold geographic distance of the merchant device 104 can be accomplished in different ways including, for example, determining whether the buyer device 116 is within a threshold geographic radius of the merchant device 104, determining whether the buyer device 116 is within a particular geofence, or determining whether the buyer device 116 can communicate with the merchant device 104 using a specified wireless technology, e.g., Bluetooth® or Bluetooth® low energy (BLE). In some embodiments, the payment and item recommendation system 1000 restricts electronic payment transactions between the participating buyer 114p and the merchant 108 to situations where the geographic location of the buyer device 116 is within a threshold geographic distance from a geographic location of the merchant device 104.

The payment and item recommendation system 1000 can also be configured to communicate with one or more computing devices 1004 of a card payment network (e.g., MasterCard®, VISA®) over the one or more networks 106 to conduct financial transactions electronically. The payment and item recommendation system 1000 can also communicate with one or more bank computing devices 1006 of one or more banks over the one or more networks 106. For example, the payment and item recommendation system 1000 may communicate with an acquiring bank, and/or an issuing bank, and/or a bank maintaining buyer accounts for electronic payments.

An acquiring bank may be a registered member of a card association (e.g., Visa®, MasterCard®), and may be part of a card payment network. An issuing bank may issue payment cards to buyers, and may pay acquiring banks for purchases made by cardholders to which the issuing bank has issued a payment card. Accordingly, in some examples, the computing device(s) of an acquiring bank may be included in the card payment network and may communicate with the computing devices of a card-issuing bank to obtain payment. Further, in some examples, the buyer may use a debit card instead of a credit card, in which case, the bank computing device(s) of a bank corresponding to the debit card may receive communications regarding a transaction in which the buyer is participating. Additionally, there may be computing devices of other financial institutions involved in some types of transactions or in alternative system architectures, and thus, the foregoing are merely several examples for discussion purposes.

The participating buyer 114p operating the buyer device 116 that is within a threshold geographic distance of the merchant device 104 can interact with the buyer application 118 executed on the buyer device 116 to conduct an electronic payment transaction with the merchant 108. While interacting with the buyer application 118, the buyer 114p can select the merchant 108, from a listing of merchants 108, with whom the buyer 114p wants to enter into an electronic payment transaction. The buyer 114p can select the merchant 108, for example, by selecting a "check in" option associated with the merchant 108. The buyer device 116 can communicate data to the payment and item recommendation system 1000 indicating that the buyer 114p has checked in with the merchant 108. In response, the payment and item recommendation system 1000 can communicate data to notify the merchant device 104 that the buyer has checked in. The merchant application 110 executing on the merchant device 104 can notify the merchant 108 that the buyer has electronically checked in with the merchant 108 through a display screen of the merchant device 104.

Once checked in, the buyer 114p can obtain, or request, items that are available to be acquired from the merchant 108. When the buyer 114p is ready to enter into the card-less payment transaction, the buyer 114p can, for example, approach a point of sale for the merchant 108 and identify him or herself. For example, the buyer 114p can verbally notify the merchant 108 that the buyer 114p wants to enter into a card-less payment transaction and can provide the merchant 108 with the buyer's name. The merchant 108 can then interact with the merchant application 110 to select the buyer 114p, from a listing of buyers that have checked in with the merchant 108, to initiate an electronic payment transaction for the item(s) being acquired by the buyer 114p. For example, the merchant 108 can determine a total amount to charge the buyer 114p for the item(s) being acquired. The buyer 114p can verbally approve the total amount to be paid and, in response, the merchant 108 can submit a request for an electronic payment transaction for the total amount of the transaction to the payment and item recommendation system 1000. In response, the payment and item recommendation system 1000 can obtain, for example, from the buyer information 126, data describing a financial account associated with the electronic purchase account of the buyer 114p to which the total amount will be charged.

The payment and item recommendation system 1000 can then communicate with the computing device 1004 of a card payment network to complete an electronic payment transaction for the total amount to be charged to the buyer's electronic payment account. Once the electronic payment transaction is complete, the payment and item recommendation system 1000 can communicate data describing the electronic payment for the transaction to the buyer device 116, e.g., as an electronic receipt, which can, for example, notify the buyer 114p of the total amount charged to the buyer for the electronic payment for the transaction with the particular merchant. Further, while a mobile buyer device 116 is described in this example for purposes of explanation, additional or alternative types of devices may be used in other examples.

In addition, in some examples, the service provider 1002 may make available one or more service provider websites 1018 that enable merchants 108 to advertise items on the service provider website(s). For example, merchants 108 may offer items for purchase to buyers on the website. The buyers may purchase the items using a web browser, or other application on a computing device, such as the buyer device 116 or other computing device. The transaction information from these transactions may be provided to the service computing device 102 to add further to the transaction information in the buyer profiles 128 and the merchant profiles 124.

In addition, the analysis module 218 and/or the item recommendation module 130 may access other websites 1010 when determining information about buyers and/or when determining item recommendations for merchants, respectively. For example, demographic information and other buyer information may be obtained from the US Census Bureau website, social network sites, a microblog site, or other online presences of the various different buyers. Similarly, geographic information may be obtained from websites that provide maps and other geographic or demographic information, or the like.

Figure 11:
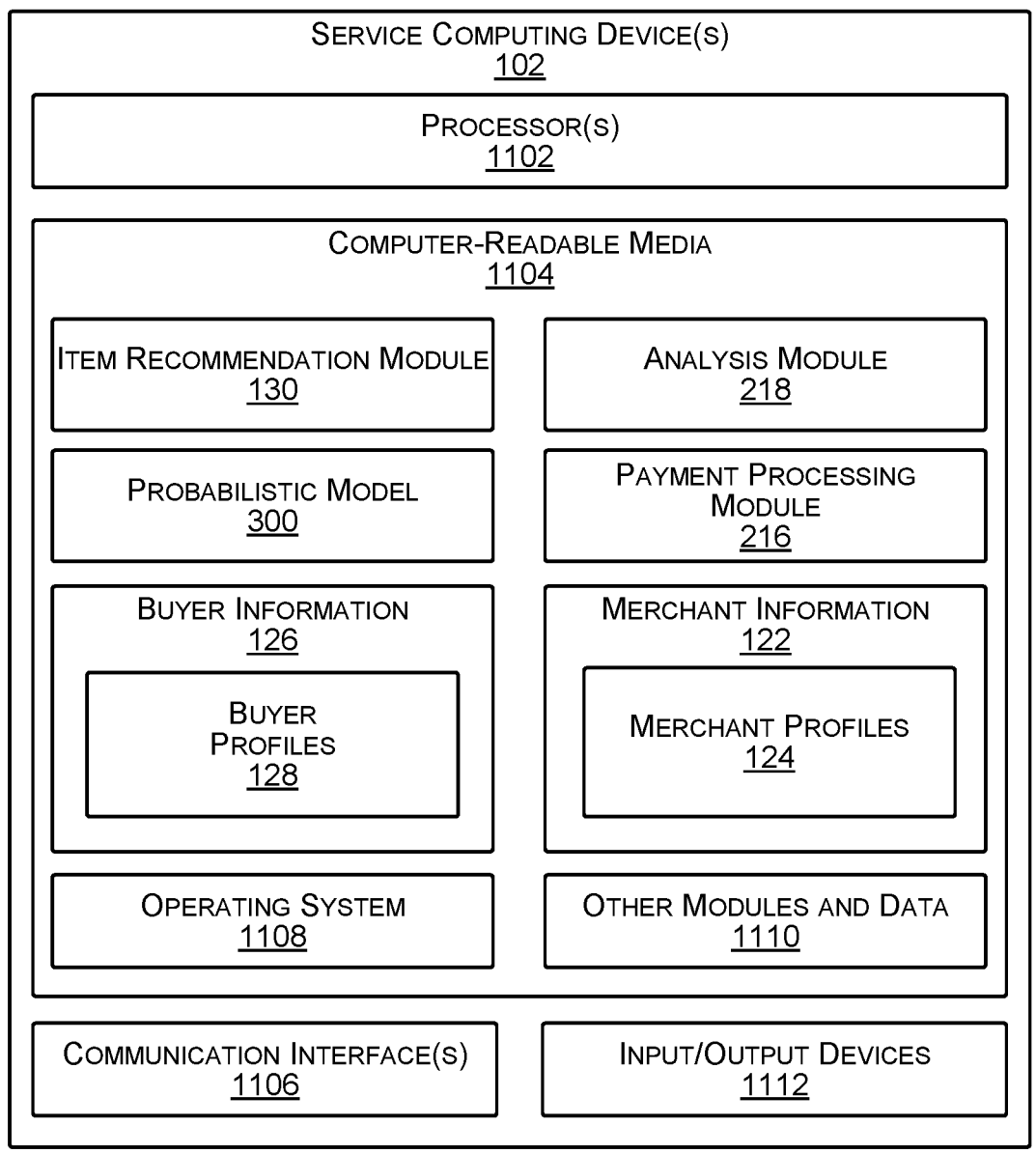
FIG. 11 illustrates select components of one or more example service computing devices according to some implementations.

FIG. 11 illustrates select components of the service computing device 102 that may be used to implement some functionality of the payment and item recommendation service described herein. The service computing device 102 may be operated by a service provider that provides the payment service and the item recommendation service, and may include one or more servers or other types of computing devices that may be embodied in any number of ways. For instance, in the case of a server, the modules, other functional components, and data may be implemented on a single server, a cluster of servers, a server farm or data center, a cloud-hosted computing service, a cloud-hosted storage service, and so forth, although other computer architectures may additionally or alternatively be used.

Further, while the figures illustrate the components and data of the service computing device 102 as being present in a single location, these components and data may alternatively be distributed across different computing devices and different locations in any manner. Consequently, the functions may be implemented by one or more service computing devices, with the various functionality described above distributed in various ways across the different computing devices. Multiple service computing devices 102 may be located together or separately, and organized, for example, as virtual servers, server banks and/or server farms. The described functionality may be provided by the servers of a single entity or enterprise, or may be provided by the servers and/or services of multiple different buyers or enterprises.

In the illustrated example, each service computing device 102 may include one or more processors 1102, one or more computer-readable media 1104, and one or more communication interfaces 1106. Each processor 1102 may be a single processing unit or a number of processing units, and may include single or multiple computing units or multiple processing cores. The processor(s) 1102 can be implemented as one or more microprocessors, microcomputers, microcontrollers, digital signal processors, central processing units, state machines, logic circuitries, and/or any devices that manipulate signals based on operational instructions. For instance, the processor(s) 1102 may be one or more hardware processors and/or logic circuits of any suitable type specifically programmed or configured to execute the algorithms and processes described herein. The processor(s) 1102 can be configured to fetch and execute computer-readable instructions stored in the computer-readable media 1104, which can program the processor(s) 1102 to perform the functions described herein.

The computer-readable media 1104 may include volatile and nonvolatile memory and/or removable and non-removable media implemented in any type of technology for storage of information, such as computer-readable instructions, data structures, program modules, or other data. Such computer-readable media 1104 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the service computing device 102, the computer-readable media 1104 may be a type of computer-readable storage media and/or may be a tangible non-transitory media to the extent that when mentioned, non-transitory computer-readable media exclude media such as energy, carrier signals, electromagnetic waves, and signals per se.

The computer-readable media 1104 may be used to store any number of functional components that are executable by the processors 1102. In many implementations, these functional components comprise instructions or programs that are executable by the processors 1102 and that, when executed, specifically configure the one or more processors 1102 to perform the actions attributed above to the service computing device 102. Functional components stored in the computer-readable media 1104 may include the item recommendation module 130, the analysis module 218, and the payment processing module 216. Additional functional components stored in the computer-readable media 1104 may include an operating system 1108 for controlling and managing various functions of the service computing device 102.

In addition, the computer-readable media 1104 may store data used for performing the operations described herein. Thus, the computer-readable media may store the merchant information 122, including the merchant profiles 124, and the buyer information 126, including the buyer profiles 128. In addition, at least a portion of the probabilistic model 300 may be stored on the computer-readable media and/or the service computing device 102 may access or generate the probabilistic model 300. The service computing device 102 may also include or maintain other functional components and data, such as other modules and data 1110, which may include programs, drivers, etc., and the data used or generated by the functional components. Further, the service computing device 102 may include many other logical, programmatic and physical components, of which those described above are merely examples that are related to the discussion herein.

The communication interface(s) 1106 may include one or more interfaces and hardware components for enabling communication with various other devices, such as over the network(s) 106. For example, communication interface(s) 1106 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

The service computing device 102 may further be equipped with various input/output (I/O) devices 1112. Such I/O devices 1112 may include a display, various user interface controls (e.g., buttons, joystick, keyboard, mouse, touch screen, etc.), audio speakers, connection ports and so forth.

Figure 12:
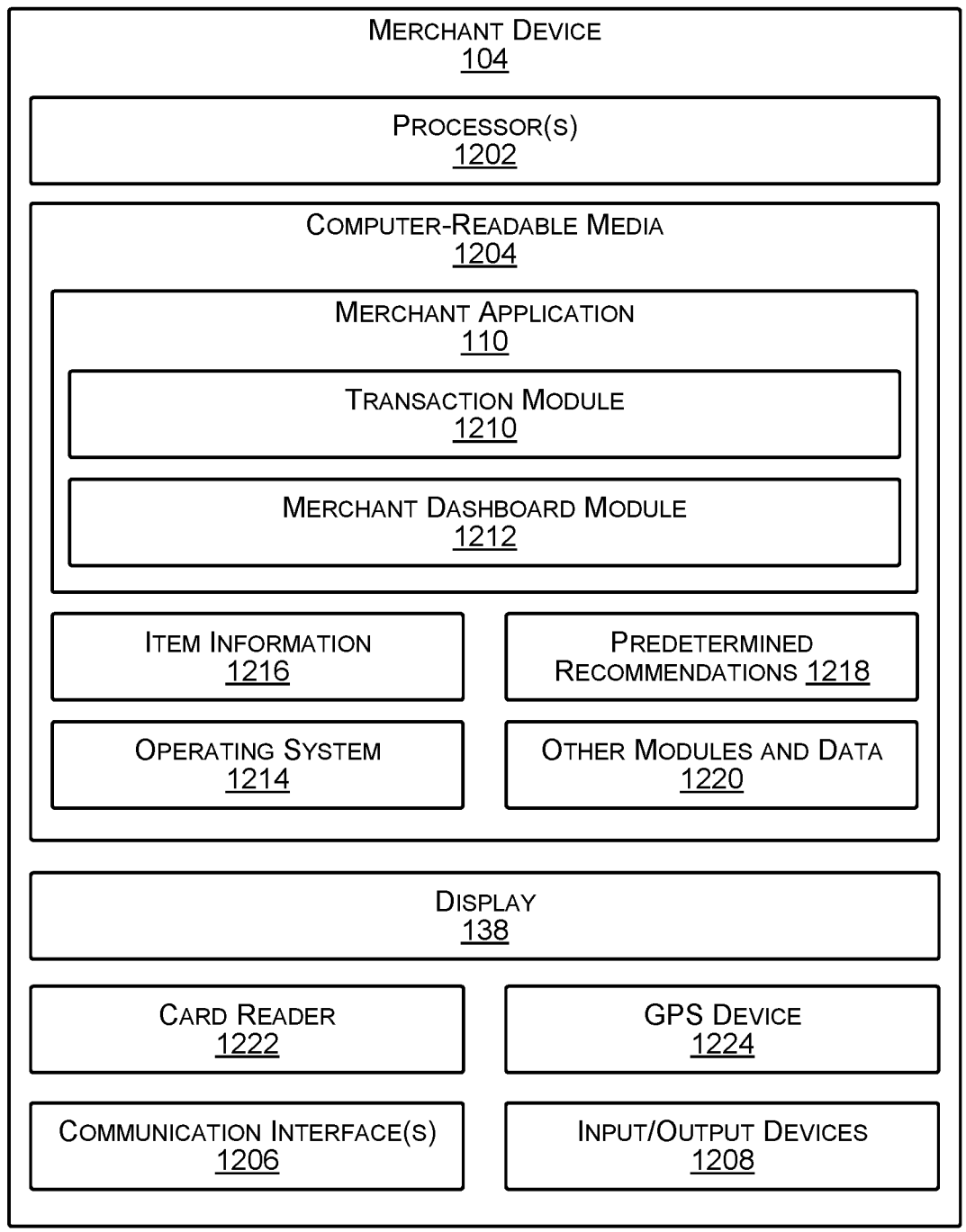
FIG. 12 illustrates select components of an example merchant device according to some implementations.

FIG. 12 illustrates select example components of an example merchant device 104 according to some implementations. The merchant device 104 may be any suitable type of computing device, e.g., portable, semi-portable, semi-stationary, or stationary. Some examples of the merchant device 104 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; augmented reality devices; or other computing devices capable of sending communications and performing the functions according to the techniques described herein.

In the illustrated example, the merchant device 104 includes at least one processor 1202, one or more computer-readable media 1204, one or more communication interfaces 1206, and one or more input/output (I/O) devices 1208. Each processor 1202 may itself comprise one or more processors or processing cores. For example, the processor 1202 can be implemented as one or more microprocessors, microcomputers, microcontrollers, digital signal processors, central processing units, state machines, logic circuitries, and/or any devices that manipulate signals based on operational instructions. In some cases, the processor 1202 may be one or more hardware processors and/or logic circuits of any suitable type specifically programmed or configured to execute the algorithms and processes described herein. The processor 1202 can be configured to fetch and execute computer-readable processor-executable instructions stored in the computer-readable media 1204.

Depending on the configuration of the merchant device 104, the computer-readable media 1204 may be an example of tangible non-transitory computer storage media and may include volatile and nonvolatile memory and/or removable and non-removable media implemented in any type of technology for storage of information such as computer-readable processor-executable instructions, data structures, program modules or other data. The computer-readable media 1204 may include, but is not limited to, RAM, ROM, EEPROM, flash memory, solid-state storage, magnetic disk storage, optical storage, and/or other computer-readable media technology. Further, in some cases, the merchant device 104 may access external storage, such as RAID storage systems, storage arrays, network attached storage, storage area networks, cloud storage, or any other medium that can be used to store information and that can be accessed by the processor 1202 directly or through another computing device or network. Accordingly, the computer-readable media 1204 may be computer storage media able to store instructions, modules or components that may be executed by the processor 1202. Further, when mentioned, non-transitory computer-readable media exclude media such as energy, carrier signals, electromagnetic waves, and signals per se.

The computer-readable media 1204 may be used to store and maintain any number of functional components that are executable by the processor 1202. In some implementations, these functional components comprise instructions or programs that are executable by the processor 1202 and that, when executed, implement operational logic for performing the actions and services attributed above to the merchant device 104. Functional components of the merchant device 104 stored in the computer-readable media 1204 may include the merchant application 110. In this example, the merchant application 110 includes a transaction module 1210 and a merchant dashboard module 1212. For example, the transaction module 1210 may present an interface, such as the payment interface 706 discussed above, to enable the merchant to conduct transactions, receive payments, and so forth, as well as communicating with the service computing device 102 for processing payments and sending transaction information. Further, the merchant dashboard module 1212 may present an interface to enable the merchant to manage the merchant's account, the merchant profile, merchant preferences, view saved or new item recommendations, and the like. Additional functional components may include an operating system 1214 for controlling and managing various functions of the merchant device 104 and for enabling basic user interactions with the merchant device 104.

In addition, the computer-readable media 1204 may also store data, data structures and the like, that are used by the functional components. For example, data stored by the computer-readable media 1204 may include item information 1216 that includes information about the items offered by the merchant, which may include a list of items currently available from the merchant, images of the items, descriptions of the items, prices of the items, and so forth. Furthermore, the computer readable media may have stored thereon predetermined recommendations 1218 that may be received from the service provider in advance to enable the merchant device 104 to provide recommendations in an offline mode, or the like. Depending on the type of the merchant device 104, the computer-readable media 1204 may also optionally include other functional components and data, such as other modules and data 1220, which may include programs, drivers, etc., and the data used or generated by the functional components. Further, the merchant device 104 may include many other logical, programmatic and physical components, of which those described are merely examples that are related to the discussion herein.

The communication interface(s) 1206 may include one or more interfaces and hardware components for enabling communication with various other devices, such as over the network(s) 106 or directly. For example, communication interface(s) 1206 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

FIG. 12 further illustrates that the merchant device 104 may include the display 138 mentioned above. Depending on the type of computing device used as the merchant device 104, the display 138 may employ any suitable display technology. For example, the display 138 may be a liquid crystal display, a plasma display, a light emitting diode display, an OLED (organic light-emitting diode) display, an electronic paper display, or any other suitable type of display able to present digital content thereon. In some examples, the display 138 may have a touch sensor associated with the display 138 to provide a touchscreen display configured to receive touch inputs for enabling interaction with a graphic interface presented on the display 138. Accordingly, implementations herein are not limited to any particular display technology. Alternatively, in some examples, the merchant device 104 may not include the display 138, and information may be present by other means, such as aurally.

The merchant device 104 may further include the one or more I/O devices 1208. The I/O devices 1208 may include speakers, a microphone, a camera, and various user controls (e.g., buttons, a joystick, a keyboard, a keypad, etc.), a haptic output device, and so forth.

In addition, the merchant device 104 may include or may be connectable to a card reader 1222. In some examples, the card reader may plug in to a port in the merchant device, such as a microphone/headphone port, a data port, or other suitable port. The card reader may include a read head for reading a magnetic strip of a payment card, and further may include encryption technology for encrypting the information read from the magnetic strip. Alternatively, numerous other types of card readers may be employed with the merchant devices 104 herein, depending on the type and configuration of the merchant device 104.

Other components included in the merchant device 104 may include various types of sensors, which may include a GPS device 1224 able to indicate location information, as well as other sensors (not shown) such as an accelerometer, gyroscope, compass, proximity sensor, and the like. Additionally, the merchant device 104 may include various other components that are not shown, examples of which include removable storage, a power source, such as a battery and power control unit, and so forth.

Figure 13:
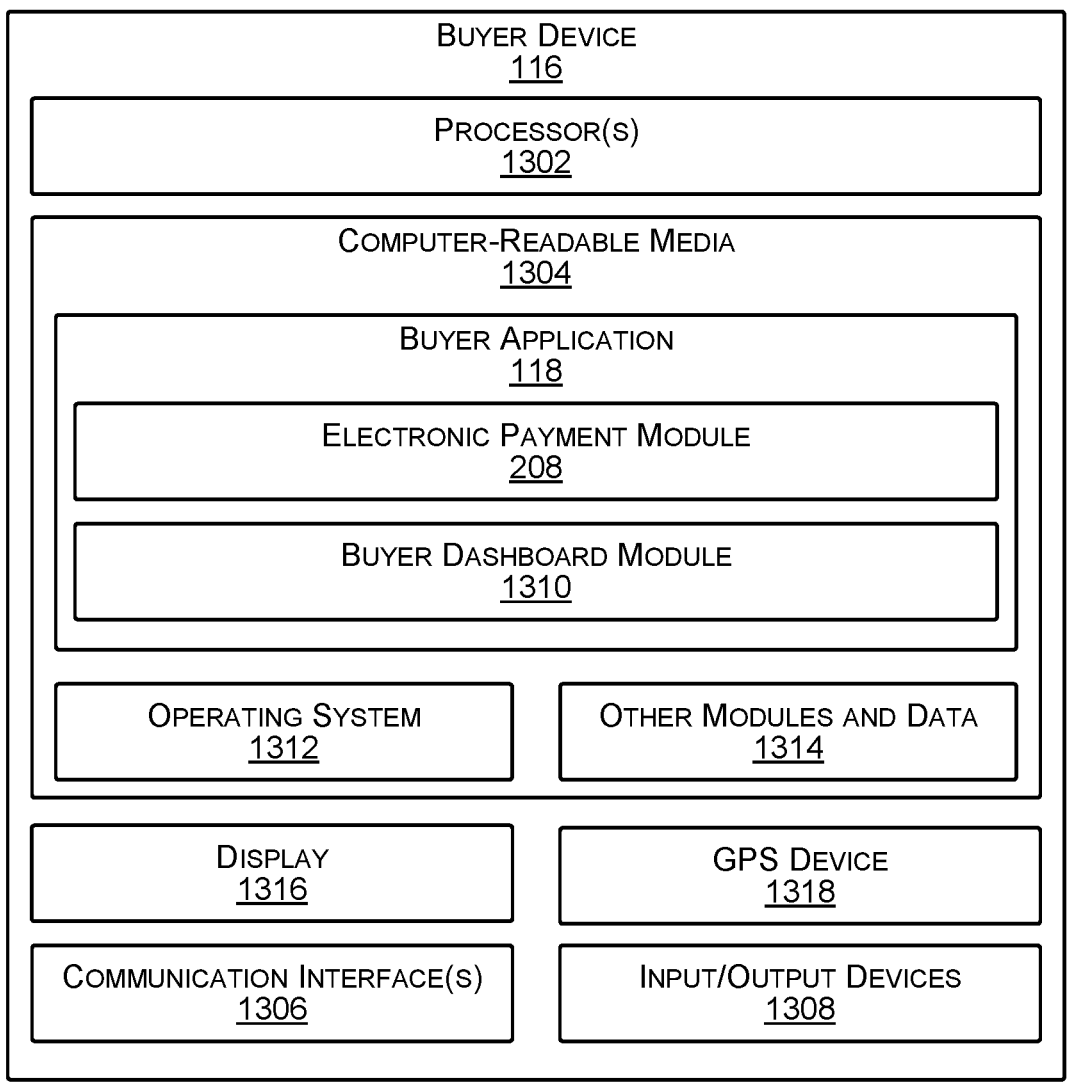
FIG. 13 illustrates select components of an example buyer device according to some implementations.

FIG. 13 illustrates select example components of the buyer device 116 that may implement the functionality described above according to some examples. The buyer device 116 may be any of a number of different types of portable computing devices. Some examples of the buyer device 116 may include smart phones and mobile communication devices; tablet computing devices; laptops, netbooks and other portable computers; wearable computing devices and/or body-mounted computing devices, which may include watches and augmented reality devices, such as helmets, goggles or glasses; and any other portable device capable of sending communications and performing the functions according to the techniques described herein.

In the example of FIG. 13, the buyer device 116 includes components such as at least one processor 1302, one or more computer-readable media 1304, the one or more communication interfaces 1306, and one or more input/output (I/O) devices 1314. Each processor 1302 may itself comprise one or more processors or processing cores. For example, the processor 1302 can be implemented as one or more microprocessors, microcomputers, microcontrollers, digital signal processors, central processing units, state machines, logic circuitries, and/or any devices that manipulate signals based on operational instructions. In some cases, the processor 1302 may be one or more hardware processors and/or logic circuits of any suitable type specifically programmed or configured to execute the algorithms and processes described herein. The processor 1302 can be configured to fetch and execute computer-readable processor-executable instructions stored in the computer-readable media 1304.

Depending on the configuration of the buyer device 116, the computer-readable media 1304 may be an example of tangible non-transitory computer storage media and may include volatile and nonvolatile memory and/or removable and non-removable media implemented in any type of technology for storage of information such as computer-readable processor-executable instructions, data structures, program modules or other data. The computer-readable media 1304 may include, but is not limited to, RAM, ROM, EEPROM, flash memory, solid-state storage, magnetic disk storage, optical storage, and/or other computer-readable media technology. Further, in some cases, the buyer device 116 may access external storage, such as RAID storage systems, storage arrays, network attached storage, storage area networks, cloud storage, or any other medium that can be used to store information and that can be accessed by the processor 1302 directly or through another computing device or network. Accordingly, the computer-readable media 1304 may be computer storage media able to store instructions, modules or components that may be executed by the processor 1302. Further, when mentioned, non-transitory computer-readable media exclude media such as energy, carrier signals, electromagnetic waves, and signals per se.

The computer-readable media 1304 may be used to store and maintain any number of functional components that are executable by the processor 1302. In some implementations, these functional components comprise instructions or programs that are executable by the processor 1302 and that, when executed, implement operational logic for performing the actions and services attributed above to the buyer device 116. Functional components of the buyer device 116 stored in the computer-readable media 1304 may include the buyer application 118, as discussed above. In this example, the buyer application 118 includes the electronic payment module 208, as discussed above, and a buyer dashboard module 1310. For example, the buyer dashboard module 1310 may present the buyer with an interface for managing the buyer's account, changing information, changing preferences, and so forth. Additional functional components may include an operating system 1312 for controlling and managing various functions of the buyer device 116 and for enabling basic user interactions with the buyer device 116.

In addition, the computer-readable media 1304 may also store data, data structures and the like, that are used by the functional components. Depending on the type of the buyer device 116, the computer-readable media 1304 may also optionally include other functional components and data, such as other modules and data 1306, which may include applications, programs, drivers, etc., and the data used or generated by the functional components. Further, the buyer device 116 may include many other logical, programmatic and physical components, of which those described are merely examples that are related to the discussion herein.

The communication interface(s) 1306 may include one or more interfaces and hardware components for enabling communication with various other devices, such as over the network(s) 106 or directly. For example, communication interface(s) 1306 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

FIG. 13 further illustrates that the buyer device 116 may include a display 1316. Depending on the type of computing device used as the buyer device 116, the display may employ any suitable display technology. For example, the display 1316 may be a liquid crystal display, a plasma display, a light emitting diode display, an OLED (organic light-emitting diode) display, an electronic paper display, or any other suitable type of display able to present digital content thereon. In some examples, the display 1316 may have a touch sensor associated with the display 1316 to provide a touchscreen display configured to receive touch inputs for enabling interaction with a graphic interface presented on the display 1316. Accordingly, implementations herein are not limited to any particular display technology. Alternatively, in some examples, the buyer device 116 may not include a display.

The buyer device 116 may further include the one or more I/O devices 1308. The I/O devices 1308 may include speakers, a microphone, a camera, and various user controls (e.g., buttons, a joystick, a keyboard, a keypad, etc.), a haptic output device, and so forth.

Other components included in the buyer device 116 may include various types of sensors, which may include a GPS device 1318 able to indicate location information, as well as other sensors (not shown) such as an accelerometer, gyroscope, compass, proximity sensor, and the like. Additionally, the buyer device 116 may include various other components that are not shown, examples of which include removable storage, a power source, such as a battery and power control unit, and so forth.

Various instructions, methods and techniques described herein may be considered in the general context of computer-executable instructions, such as program modules stored on computer-readable media, and executed by the processor(s) herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A method comprising:
    receiving, from merchant computing devices associated with a plurality of merchants associated with a payment processing system, transaction data associated with transactions performed between the plurality of merchants and buyers;
    training a first model to generate profiles, wherein the first model is trained using at least one of:
        merchant data associated with the plurality of merchants;
        buyer data associated with the buyers; or
        the transaction data associated with the transactions;
    receiving an indication of a transaction between a buyer of the buyers and a merchant of the plurality of merchants, wherein the transaction comprises a selection of an item for purchase by the buyer from the merchant;
    comparing information associated with the buyer to the profiles;
    determining that the information associated with the buyer does not correspond to an individual profile of the profiles;
    determining, using a second model and based on the first model and the indication of the transaction, that a characteristic of the transaction corresponds to a profile of the profiles with a confidence score that is above a predetermined threshold, wherein the second model is a probabilistic model and wherein the characteristic is associated with at least one of the buyer, the merchant, or the transaction;
    causing presentation, via a graphical user interface (GUI) displayed on a merchant computing device associated with the merchant, of a plurality of selectable icons corresponding to a plurality of items offered for purchase by the merchant;
    generating, based at least in part on a portion of the transaction data being associated with one or more other merchants of the plurality of merchants that offer the item for purchase and a determination that the characteristic corresponds to the profile, a recommendation for the buyer to purchase at least one additional item with the item that the buyer has already selected for purchase; and
    in response to generating the recommendation, causing a rendering of a new selectable icon corresponding to a combination of the item and the at least one additional item, wherein the new selectable icon is presented temporarily and not permanently with the plurality of selectable icons.

2. The method of claim 1, wherein the profiles are first profiles and further comprising:
    retraining the first model based at least in part on at least one of additional transaction data, additional merchant data, or additional buyer data;
    generating second profiles using the retrained first model; and
    generating the recommendation based at least in part on the characteristic corresponding to a second profile of the second profiles.

3. The method of claim 1, wherein the transaction data includes at least one of a description of one or more items selected by the buyers in association with the transactions, pricing information associated with the one or more items, payment information associated with the transactions, geographic information associated with the transactions, time information associated with the transactions, date information associated with the transactions, or buyer identifying information associated with the transactions.

4. The method of claim 1, wherein the merchant computing device includes an instance of a merchant application installed thereon for configuring the merchant computing device as a point-of-sale (POS) terminal to communicate data over one or more networks to the payment processing system.

5. The method of claim 1, wherein the recommendation comprises a first recommendation, the method further comprising:
    generating, using the first model or a third model, a second recommendation to merge two or more profiles of the profiles.

6. The method of claim 1, further comprising:
  detecting one or more of (1) an interaction with an icon of the plurality of selectable icons, (2) a scan of a barcode associated with the item, or (3) an input to a buyer device of the buyer,
  wherein determining that the buyer has selected the item for purchase is based at least in part on one of the interaction, the scan, or the input.

7. The method of claim 1, wherein generating the recommendation is further based at least in part on applying a third model to at least the portion of the transaction data associated with the one or more other merchants of the plurality of merchants or another portion of the transaction data associated with the one or more other merchants of the plurality of merchants.

8. The method of claim 1, wherein the characteristic is associated with an indication in the profile that the buyer has purchased a second additional item in a historical transaction if offered the at least one additional item in a promotion or as part of a bundle with a first item.

9. The method of claim 1, wherein the recommendation comprises a first recommendation, wherein the at least one additional item comprises an alternative to a preferred item, and the method further comprising:
  determining an inventory of the merchant;
  determining to generate a second recommendation to purchase the preferred item in addition to the item that the buyer has already selected for purchase;
  determining that the preferred item is not in the inventory of the merchant;
  refraining from generating the second recommendation to purchase the preferred item; and
  sending a suggestion to the merchant computing device, to add the preferred item to the inventory, wherein generating the first recommendation for the buyer to purchase the at least one additional item is further based at least in part on determining that the preferred item is not in the inventory.

10. A system comprising:
  one or more processors; and
  one or more non-transitory computer-readable media storing instructions executable by the one or more processors, wherein the instructions cause the one or more processors to perform acts comprising:
    receiving, from merchant computing devices associated with a plurality of merchants associated with a payment processing system, transaction data associated with transactions performed between the plurality of merchants and buyers;
    training a first model to generate profiles, wherein the first model is trained using at least one of:
      merchant data associated with the plurality of merchants;
      buyer data associated with the buyers; or
      the transaction data associated with the transactions;
    receiving an indication of a transaction between a buyer of the buyers and a merchant of the plurality of merchants, wherein the transaction comprises a selection of an item for purchase by the buyer from the merchant;
    comparing information associated with the buyer to the profiles;
    determining that the information associated with the buyer does not correspond to an individual profile of the profiles;
    determining, using a second model and based on the first model and the indication of the transaction, that a characteristic of the transaction corresponds to a profile of the profiles with a confidence score that is above a predetermined threshold, wherein the second model is a probabilistic model, and wherein the characteristic is associated with at least one of the buyer, the merchant, or the transaction;
    causing presentation, via a graphical user interface (GUI) displayed on a merchant computing device associated with the merchant, of a plurality of selectable icons corresponding to a plurality of items offered for purchase by the merchant;
    generating, based at least in part on a portion of the transaction data being associated with one or more other merchants of the plurality of merchants that offer the item for purchase and a determination that the characteristic corresponds to the profile, a recommendation for the buyer to purchase at least one additional item with the item that the buyer has already selected for purchase; and
    in response to generating the recommendation, causing a rendering of a new selectable icon corresponding to a combination of the item and the at least one additional item, wherein the new selectable icon is presented temporarily and not permanently with the plurality of selectable icons.

11. The system of claim 10, wherein the profiles are first profiles and the acts further comprising:
  retraining the first model based at least in part on at least one of additional transaction data, additional merchant data, or additional buyer data;
  generating second profiles; and
  generating the recommendation based at least in part on the characteristic corresponding to a second profile of the second profiles.

12. The system of claim 10, wherein the transaction data includes at least one of a description of one or more items selected by the buyers in association with the transactions, pricing information associated with the one or more items, payment information associated with the transactions, geographic information associated with the transactions, time information associated with the transactions, date information associated with the transactions, or buyer identifying information associated with the transactions.

13. The system of claim 10, wherein the merchant computing device includes an instance of a merchant application installed thereon for configuring the merchant computing device as a point-of-sale (POS) terminal to communicate data over one or more networks to the payment processing system.

14. The system of claim 10, wherein the recommendation comprises a first recommendation, the acts further comprising:
  generating, using the first model or a third another model, a second recommendation to merge two or more profiles of the profiles.

15. The system of claim 10, the acts further comprising:
  detecting one or more of (1) an interaction with an icon of the plurality of selectable icons (2) a scan of a barcode associated with the item, or (3) an input to a buyer device of the buyer,
  wherein determining that the buyer has selected the item for purchase is based at least in part on one of the interaction, the scan, or the input.

16. One or more non-transitory computer-readable media storing instructions executable by one or more processors that, when executed by the one or more processors, cause the one or more processors to perform acts comprising:

receiving, from merchant computing devices associated with a plurality of merchants associated with a payment processing system, transaction data associated with transactions performed between the plurality of merchants and buyers;

training a first model to generate profiles, wherein the first model is trained using at least one of:
  merchant data associated with the plurality of merchants;
  buyer data associated with the buyers; or
  the transaction data associated with the transactions;

receiving an indication of a transaction between a buyer of the buyers and a merchant of the plurality of merchants, wherein the transaction comprises a selection of an item for purchase by the buyer from the merchant;

comparing information associated with the buyer to the profiles;

determining that the information associated with the buyer does not correspond to an individual profile of the profiles;

determining, using a second model and based on the first model and the indication of the transaction, that a characteristic of the transaction corresponds to a profile of the profiles with a confidence score that is above a predetermined threshold, wherein the second model is a probabilistic model, and wherein the characteristic is associated with at least one of the buyer, the merchant, or the transaction;

causing presentation, via a graphical user interface (GUI) displayed on a merchant computing device associated with the merchant, of a plurality of selectable icons corresponding to a plurality of items offered for purchase by the merchant;

generating, based at least in part on a portion of the transaction data being associated with one or more other merchants of the plurality of merchants that offer the item for purchase and a determination that the characteristic corresponds to the profile, a recommendation for the buyer to purchase at least one additional item than with the item that the buyer has already selected for purchase; and in response to generating the recommendation, causing a rendering of a new selectable icon corresponding to a combination of the item and the at least one additional item, wherein the new selectable icon is presented temporarily and not permanently with the plurality of selectable icons.

17. The one or more non-transitory computer-readable media of claim 16, wherein generating the recommendation is further based at least in part on applying a third model to at least the portion of the transaction data associated with the one or more other merchants of the plurality of merchants or another portion of the transaction data associated with the one or more other merchants of the plurality of merchants.

18. The one or more non-transitory computer-readable media of claim 16, wherein the characteristic is associated with an indication in the profile that the buyer has purchased a second additional item in a historical transaction if offered the at least one additional item in a promotion or as part of a bundle with a first item.

19. The one or more non-transitory computer-readable media of claim 16, wherein the recommendation comprises a first recommendation, wherein the at least one additional item comprises an alternative to a preferred item, and the acts further comprising:
  determining an inventory of the merchant;
  determining to generate a second recommendation to purchase the preferred item in addition to the item that the buyer has already selected for purchase;
  determining that the preferred item is not in the inventory of the merchant;
  refraining from generating the second recommendation to purchase the preferred item; and
  sending a suggestion to the merchant computing device, to add the preferred item to the inventory, wherein generating the first recommendation for the buyer to purchase the at least one additional item is further based at least in part on determining that the preferred item is not in the inventory.

20. The one or more non-transitory computer-readable media of claim 16, wherein the profiles are first profiles and the acts further comprising:
  retraining the first model based at least in part on at least one of additional transaction data, additional merchant data, or additional buyer data:
  generating second profiles using the retrained first model; and
  generating the recommendation based at least in part on the characteristic corresponding to a second profile of the second profiles.

* * * * *